United States Patent [19]

Sheu et al.

[11] Patent Number: 5,508,119
[45] Date of Patent: Apr. 16, 1996

[54] ENHANCED WORK ROLL SURFACE TEXTURE FOR COLD AND HOT ROLLING OF ALUMINUM AND ITS ALLOYS

[75] Inventors: Shen Sheu; Louis G. Hector, Jr., both of Murrysville; Joseph M. Gorman, Sr., Verona, all of Pa.

[73] Assignee: Aluminum Company of America, Pittsburgh, Pa.

[21] Appl. No.: 302,365

[22] Filed: Sep. 7, 1994

[51] Int. Cl.$^6$ .......................... B21D 53/00; B21B 27/02; B23K 26/02

[52] U.S. Cl. ...................... 428/687; 219/121.67; 72/199; 492/30

[58] Field of Search ...................................... 428/600, 687; 72/199, 252.5, 366.2; 219/121.67, 121.68, 121.69; 29/895; 492/30, 33, 35

[56] References Cited

U.S. PATENT DOCUMENTS

| | | | |
|---|---|---|---|
| 4,322,600 | 3/1982 | Cranay | 219/121.68 |
| 4,628,179 | 12/1986 | Cranay | 219/121.68 |
| 4,806,731 | 2/1989 | Bragard et al. | 219/121.68 |
| 4,841,611 | 6/1989 | Kusaba et al. | 492/31 |
| 4,959,275 | 9/1990 | Iguchi et al. | 428/687 |
| 4,978,583 | 12/1990 | Wakui et al. | 492/37 |
| 4,996,113 | 2/1991 | Hector et al. | 428/687 |
| 5,025,547 | 6/1991 | Sheu et al. | 72/199 |
| 5,143,578 | 9/1992 | Luthi | 219/121.68 |
| 5,250,364 | 10/1993 | Hector et al. | 428/687 |
| 5,324,594 | 6/1994 | Yasuda et al. | 428/687 |
| 5,391,856 | 2/1995 | Minamidu | 219/121.69 |

*Primary Examiner*—John Zimmerman
*Attorney, Agent, or Firm*—Elroy Strickland

[57] ABSTRACT

A method of making a strip product having a surface that is both bright and clean after being rolled by work rolls in a roll stand. The work rolls are polished to remove grind lines from the roll surfaces, and the roll surfaces are provided with minute, ovoid depressions having relatively shallow slopes extending in the direction of rolling, followed by steeper slopes at the opposite ends of the depressions. The depressions are created by a laser beam directed against the roll surfaces at oblique incidence to the roll surface normal during relative movement of the beam and roll surfaces. The roll surfaces are then polished to remove any roll material that is raised above the nominal surface of the rolls, the raised material being the result of melting of the roll surfaces and the deposition of roll material vaporized by the laser beam. The strip is reduced in thickness with such textured rolls without substantial micromachining of the surface of the strip such that the generation of wear debris and smudge is minimized in reducing the thickness of the strip.

22 Claims, 18 Drawing Sheets

ENHANCED WORK ROLL SURFACE TEXTURE FOR COLD AND HOT ROLLING OF ALUMINUM AND ITS ALLOYS

BACKGROUND OF THE INVENTION

The present invention relates to textured rolls and roll texturing processes and related rolling process enhancements for both cold and hot rolling of aluminum and its alloys, such rolling process enhancements resulting when the textured rolls are used to reduce the thickness of the rolled material. The invention also relates to enhancements to the functional properties of the strip surface (in the case of cold rolling) and/or the slab surface (in the case of hot rolling) that result when rolling with textured rolls. The roll texture permits massive reductions (the word "massive" referring to cold rolling processes involving product thickness reductions at or in excess of 55%) in the thickness of strip material passing through a stand of a cold rolling mill due to the ability of the texture to entrap and thereby draw adequate quantities of lubricant into the roll bite, while simultaneously forming a substantially non-directional strip surface texture that results from micro-backwards extrusion of microscopic quantities of strip material into each element of the roll texture, such small quantities being subject to concurrent smearing due to the kinematics associated with massive thickness reduction rolling processes. The present invention also relates to the application of the aforementioned cold rolling roll textures to hot rolling processes wherein a slab at elevated temperatures is reduced in thickness with rolls textured with the method of the invention during normal thickness reduction hot rolling (the word "normal" pertaining to approximately 40% thickness reduction rolling). The roll textures act to entrap lubricant in what is otherwise a lubricant-depleted roll bite (the depletion of lubricant resulting from the extreme temperatures associated with hot rolling), such lubricant then being expelled to the roll/slab interface upon which time it acts to substantially minimize material transference due to adhesion between the roll surfaces and the slab surfaces and minimizes rolled-in debris and smudge on the slab surface as it enters the cold rolling stands. Note that the word "strip" will be used throughout the following discussion to refer to cold-rolled sheet products having a nominal thickness that is less than 0.125 inch. The word "slab" will be used throughout the following discussion to refer to hot-rolled plate products having a nominal thickness that is equal to or greater than 0.125 inch. The words "workpiece" and "product" are generic references to either a strip or slab and hence are used with reference to both the cold and hot rolling processes considered herein.

Strip thickness reductions in a single pass through a cold mill stand involving "hard" aluminum alloys, i.e., alloys other than 1100, are usually limited to about 45%. Massive thickness reductions (55% or more) with ground work rolls lead to lubricant film breakdown and the undesirable herringbone effect, which is a period marking of a strip surface at some angle relative to the rolling direction. The herringbone defect is a visual manifestation on the strip surface of a stick-slip phenomenon in the roll bite, which is caused by a periodic changeover between hydrodynamic, thick film lubrication to boundary film lubrication, the latter being essentially no lubrication at various locations in the roll bite and involving metal-to-metal contact. Aluminum alloys are particularly susceptible to the herringbone phenomenon, as discussed in Chapter Six of Tribology in Metalworking. Friction Lubrication and Wear by J. A. Shey, American Society for Metals, 1983. A more familiar manifestation of a stick-slip phenomenon, for example, occurs when automobile windshield wipers begin to wear out. This results in a loud vibrating sound and an imperfect wiping action along the windshield.

Further, rolling speeds are typically lower when thickness reductions are higher, and this leads to thinner lubricant films in the roll bite. In addition, ground finishes on work roll surfaces tend to promote lubricant channeling out of the roll bite instead of retention of lubricant in the roll bite in both hot and cold rolling processes. Longitudinal roll grind marks on an aluminum strip surface, which result from the imprint of a ground finish on a work roll with an intermittent texture, are visible in FIG. 1 of the drawings.

Other process problems associated with massive thickness reduction cold rolling processes are excessive heat generation due to the work of plastic deformation of the strip, excessive slip in the backup roll drives and excessive negative forward slip between the strip and the work rolls. Forward slip is defined as the difference between the strip surface speed and the roll surface speed (both quantities being measured in the exit plane of a roll bite), this difference then being divided by the strip surface speed in the exit plane. Negative forward slip indicates a possible condition of mill instability where the work roll surface speed exceeds the strip speed as the strip exits the roll bite and hence the roll surface skids over the strip surfaces either periodically or in a constant fashion.

Ground roll surfaces also promote degradation of the cold rolled strip surface brightness through the proliferation of micro-cracks or fissures that form transversely to the rolling direction. The generation of transverse fissures during rolling of a strip of material with work rolls having ground finishes and the resulting degradation in the functional properties of the rolled strip have been discussed in detail in the Applicants' U.S. Pat. No. 4,996,113 entitled "Brightness Enhancement with Textured Roll" issued Feb. 26, 1991.

With the above problems in mind, it should be noted that cold rolled strip and hot rolled slab products are the most widely used materials in the world. It is, therefore, no surprise that rolling is the most important bulk metal forming process from an economic standpoint. In the steel and aluminum industries alone, millions of tons of metal are processed each year by hot and cold rolling, the rolling process beginning with cast ingots. Rolled materials are used in the manufacture of a large variety of products which include such modern-day necessities as automobiles, household appliances, aircraft structural components and beverage cans.

Tribological conditions in the bite of the work rolls and between the work rolls and the backup rolls have a significant impact on rolling mill performance and the quality and ultimate marketability of the rolled products. (The term "tribology" refers to the physical conditions and processes existing between contacting and rubbing surfaces). Optimum tribological conditions for rolling result, in part, through a proper combination of lubricant chemistry, coolant sprays, roll surface morphology, rolling speeds, product entry gauges, strip product thickness reduction ratios and the thermomechanical properties of the material being reduced in thickness. For example, an adequate lubricant is one that prevents substantial adhesive transfer between the workpiece and the rolls as well as inhibits retransfer of adhered workpiece material from the roll surface back to the workpiece surface, and simultaneously acts as a roll stack coolant. Improper roll surface preparation, coupled with an inadequate lubricant medium, leads to such tenacious problems as roll surface pickup, which is the transference or adherence of workpiece surface material to the roll surface, followed by retransfer of adhered workpiece material to the surface of the rolled product (FIGS. 4a to c and FIG. 5), wear debris and smudge generation in cold and hot rolling, and transverse fissure formation in a cold-rolled strip surface and broken areas in the surface of a hot-rolled slab. When a work roll becomes coated with transferred workpiece material during rolling, the roll surface no longer meets the initial surface roughness specification to which it was initially finished. Rather, the roll coating of adhered workpiece material is typically quite rugged and acts to abrade the workpiece surface leading to greater debris generation. With reference to aluminum rolling processes, wear debris consists of aluminum fines, oxides, and other solid debris. Smudge refers to a mixture of carbonaceous oil residue plus wear debris particles that are in general smaller than material filtered out of the lubricant re-circulation system employed in both cold or hot rolling mills. Smudge may consist of various chemical by-products from reactions within the roll bite between the lubricant and the workpiece surface material (examples of these by-products are metal soaps and lubricant polymers). Such by-products cause the surface of the rolled product to appear to be very dirty and hence render the product undesirable to the customer of the product. Metal pickup on a work roll with subsequent retransfer of adhered material to the workpiece surface is detrimental from both a process and product standpoint. Excessive levels of pickup and smudge generation can lead to large product losses and production downtime since the roll surfaces will tend to need more redressing (e.g., grinding). Transverse fissures that form in a strip surface substantially degrade strip appearance and often make the product less appealing to a potential customer. For example, transverse fissures in the exterior surface of an aluminum beverage can will degrade the image clarity of the can label, as discussed in the Applicants' U.S. Pat. No. 5,250,364 entitled "Rolled Product with Textured Surface for Improved Lubrication, Formability and Brightness" issued Oct. 5, 1993. At elevated rolling speeds and heavy thickness reductions during cold rolling, heat streaks, the herringbone phenomenon and center or edge buckling are common problems that decrease productivity and prohibit acceptable quality of the rolled product.

Cold rolling is typically conducted in the boundary and mixed film lubrication regimes, as discussed in Applicants' U.S. Pat. No. 4,996,113 noted above. In the mixed lubrication regime, the ratio of lubricant film thickness to composite surface roughness is about one. In this regime, lubricant flows between channels surrounding asperity contacts between the strip and work roll surfaces. Part of the compressive load within the roll gap is carried by the asperities (i.e. high points in the rugged irregularities that comprise the surface microgeometry relative to a measuring reference), and part of the load is carried by pressurized lubricant pockets between the asperities. Traction between the two surfaces is moderate and, hence, wear of the surfaces is high, resulting in a large amount of wear debris particles being generated in the roll/strip interface through micro-abrasion between the work roll and strip surfaces. When the ratio of lubricant film thickness to composite roughness is substantially less than one, a boundary lubrication regime is prevalent. When boundary films that coat the strip and work roll surface roughness break down, metal transfer is more likely since there is no intermediate medium through which separation of the surfaces is achieved, and the wear rate is high, resulting in surface damage to the work rolls, the backup rolls and the rolled product.

Further, roll separation force and roll torque are strongly influenced by the tribological conditions prevailing in the roll bite. High roll bite friction affects strip shape, flatness and product surface quality, and may result in non-homogeneous deformation of the workpiece strip, with an increased incidence of unwanted residual stress in the strip. High friction in the roll bite also limits the ability of the mill to take massive strip thickness reductions or to roll wide or thick metal. The need to roll wider strip is market driven by such industries as the beverage can industry; obviously, if one can roll wider sheet, then a larger number of beverage container blanks can be stamped per sheet width. An example of a rolling mill design that is purported to allow the rolling of wider sheet is found in U.S. Pat. No. 4,173,133 to Ima et al.

The surface aesthetic and functional properties of rolled products tend to be solely determined by the tribological conditions in the roll bite. This is true in both hot and cold rolling operations. Hot line pickup, heat streaks, smudge, rolled-in dirt, brightness and distinctness of image of the workpiece surface are just a few of the more common surface aesthetic issues. Performance of a strip material in a secondary forming operation (such as stamping, drawing, and ironing), the prevalence of a substantially isotropic frictional force component in secondary metal forming processes, such as the pressing of autobody parts, and cleanliness of the strip and the extent to which buildup of smudge on metal forming tools occurs, are examples of functional properties of rolled products that are influenced by rolling tribology.

Roll grinding has been the principal means of roll surface preparation since the nineteenth century. Roll surfaces are ground in a number of grinding operations to a specified arithmetic means roughness ($R_a$) prior to installation in a rolling mill. The grinding operation imparts a directional pattern on the roll surface, which finish, in turn, imparts a directional finish onto the strip surface during rolling, as discussed earlier in regard to FIG. 1. Unfortunately, a ground roll finish carries the previously mentioned list of problems into the rolling process and can be especially detrimental to strip surface quality. Even though these and other problems continue to burden aluminum sheet and plate manufacturers, few alternatives to a ground roll surface have been explored in the past. The reluctance to consider alternative roll surface morphologies in the aluminum industry may be due, in part, to the general failure of shot-blasted work roll surfaces in heavy thickness reduction aluminum rolling processes, even though shot blasting is successfully employed throughout the steel industry. One of the reasons shot blasting has been used in the steel industry is that steel reductions are typically not substantial or massive, as is the case with aluminum. Also, hard steel surfaces are not prone to damage as much as softer aluminum surfaces. In order to effect a compromise with the negative aspects of rolling with ground rolls, the aluminum industry has heavily invested in lubricant development, sophisticated rolling mill controls, improved grinding practices, etc., but no significant investment has been made in alternative work roll surface preparation technologies.

British specification No. 1,486,321, published in 1977, discusses increasing strip thickness reduction during cold rolling by the use of a roll texture consisting of bowl-shaped depressions created by sand blasting the rolls to a maximum bowl depth in the range of 1.0 to 15 microns. The rolls were then ground or polished following the sand blasting in order to prevent "possible adhesion of the workpiece with a roll not yet run-in" (column 3, lines 41 and 42). The bowls impeded the escape of lubricant from the roll bite entry zone, and the product finish was substantially improved. It is difficult to engineer roll surfaces with sand blasting, as the sand particles strike the roll surface in a random fashion, and hence, a surface finish comprised of discrete elements having similar dimensions is not possible. The expulsion of lubricant entrapped by a sand blasted work roll during an aluminum rolling process is substantially nonuniform and can lead to regions of the roll/workpiece interface that are depleted of lubricant. In addition, sharp cutting edges in the roll surface will abrade aluminum strip or slab material leading to excessive wear debris generation. Hence, the method of this disclosure cannot be used to effect either normal thickness reduction hot rolling or massive thickness reduction during cold rolling of aluminum and its alloys.

In the late 1970's, focused energy beam roll texturing technologies were developed to economically produce surface morphologies that can be "engineered" to influence rolling process and product performance. For example, the more familiar annular crater textures that are now quite common in the European and Japanese steel industries are typically used to emboss strip surfaces during light thickness reduction rolling, i.e., during so-called "temper rolling operations". The strip surface then becomes self-lubricating during secondary forming processes. FIG. 1 in the present application shows an aluminum surface embossed with a roll crater texture using a light thickness reduction on the order of 1 to 3%. The strip surface shows the imprint of the roll surface which was imparted to the strip surface in the absence of any significant strip surface smearing. There is a substantial amount of literature available on the annular crater work roll surface texture and the effects it has on strip performance. This includes Applicants' U.S. Pat. No. 5,025, 547, the August 1991 issue of Iron and Steel Engineer and the Applicants' Focused Energy Beam Work Roll Surface Texturing Science and Technology in the July 1993 issue of the Journal of Materials Processing and Manufacturing Science.

Generally, work roll surface crater textures developed over the past ten years are not meant for either normal thickness reduction hot rolling processes that involve rolling speeds in the 400 ft/min–1500 ft/min range, or massive thickness reduction cold rolling processes that involve high rolling speeds (e.g., on the order of 4,000 ft/min), as the crater rims can (a) promote backup roll surface damage since very large loads are transferred between the work roll and backup roll surfaces over the microscopic crater rim areas; (b) generate unacceptable levels of wear debris during aluminum rolling processes to the point where the oil filtration house for the mill becomes clogged thereby necessitating that the mill be shut down; (c) increase the load on mill stands; (d) wear down to the point where they no longer have a significant effect on the rolling process or the product surface; (e) produce undesirable aesthetic effects on aluminum strip and slab surfaces. As an example of the latter situation, FIGS. 2a and 2b in the present application show aluminum strip surfaces rolled at 35% and 60%, respectively, with the asymmetric hump work roll surface texture disclosed in U.S. Pat. No. 4,806,731 to Bragard et al. and shown in FIG. 3 of the present drawings. The roll texture is not faithfully embossed onto the strip surface, as the strip surface takes on a substantially directional component. The work roll surface texture of the Bragard et al. roll was originally designed for embossing steel strip during light thickness reduction rolling processes. The Applicants' pending application Ser. No. 238,249 entitled "Sheet Product Produced by Massive Reduction in Last Stand of Cold Rolling Process" contains a method by which massive thickness reductions can be effected in the last stand of cold rolling with an hemispherical bowl texture on the work roll surfaces. This method is limited to cold rolling since seizure of strip surface material results during normal thickness reduction hot rolling. Seizure of microscopic quantities of an aluminum strip material into hemispherical bowls on a work roll surface due to hot rolling is shown in FIG. 5. In addition, the method of the Applicants' pending application produces a strip surface texture in the last stand of cold rolling that totally differs in shape and functional performance than the strip texture produced with the method of the present invention.

SUMMARY OF THE INVENTION

There is currently no single roll surface texture that will adequately address the aforementioned rolling process and product functionality concerns that arise during both normal thickness reduction hot rolling and massive thickness reduction cold rolling of aluminum and its alloys. A special work roll surface texture is therefore needed to enable normal thickness reduction hot rolling and massive thickness reduction cold rolling of aluminum and its alloys without all of the associated detrimental effects on key rolling process issues such as wear debris generation and associated pickup of adhered workpiece surface material, and key product functionality issues, such as surface appearance degradation and reduced formability in secondary forming operations. The present invention responds to this need by use of a micron-size ovoid bowl texture that can be provided in the surfaces of either hot rolling work rolls or cold rolling work rolls, such work roll surfaces in either case having been polished prior to the texturing process to remove grind marks, the term "ovoid" being used to denote the fact that each bowl element looks like an elongated oval (when viewed at normal incidence from above the texture with an appropriate magnifying device). The bowls are formed by texturing a work roll surface with a focused $CO_2$ laser beam directed to strike the surface of a work roll at oblique incidence to the roll surface normal, and then removing any rim material due to the flow of molten metal beneath the beam or any recast material on the roll surface with an appropriate post-texturing polishing procedure. The internal morphology of the bowl texture consists of one end having a steep slope and the opposite end provided with a milder slope, as seen in FIG. 8 of the drawings. The shallow ends of the bowls, rather than the steep end of the bowls, must first enter the roll bite of both hot and cold rolling processes since the steep end of the bowl will do a more efficient job of entrapping small quantities of lubricant and hence drawing lubricant into the roll bite. This inhibits adhesive metal transfer from the hot slab surface to the work roll surface and retransfer of adhered slab material from the work roll surface back to the slab surface during normal thickness reduction hot rolling of aluminum and its alloys since backwards extrusion of microscopic quantities of slab material into the bowls causes entrapped lubricant to be expelled to the interface between the slab and the work roll. The same process holds for massive thickness reduction cold rolling processes. Unprecedented strip thickness reductions can therefore be accomplished without compromising the rolling process (by requiring slower speeds and smaller product thickness reductions, for example), strip surface quality or strip performance in secondary forming processes. The shallow ends of the bowls serve to minimize wear debris generation within the roll bite, such wear debris generation occurring more prominently in the exit plane of the roll bite due to the manner in which the workpiece surface and workpiece substrate material deform relative to one another in the roll bite. Hence, the steeper end of the bowls performs its major function of drawing more lubricant into the entry plane of the roll bite (such drawing action being especially beneficial for hot rolling processes where lubricant films can be rapidly depleted). The shallow ends of the bowl are designed to inhibit micromachining of the workpiece material in the exit plane of the roll bite since extruded workpiece surface material is smeared, rather than abraded, against the very gradual slope of the shallow ends of the bowl interiors as they recede beneath the nominal work roll surface.

Although a surface texture is formed on a slab surface during hot rolling, any remnant of this texture is typically destroyed as the slab is run through various cold rolling processes. A texture does remain on the strip surface as it exits the last stand of massive thickness reduction cold rolling processes and this texture acts to enhance the aforementioned functional properties of the strip surface for the customer.

In addition, by such unprecedented thickness reductions in cold rolling, multiple handling of coils of strip for multiple reduction passes can be reduced in number, thereby reducing handling time; and by the combining of multiple passes into a lower number of passes or even a single pass, substantial savings are realized.

It is, therefore, a primary objective of the invention to substantially minimize both wear debris, smudge and other solid waste by-products, in cold rolling processes that involve massive reductions in the thickness of the strip product, and substantially minimize wear debris, smudge generation, and pickup in hot rolling processes that involve normal thickness reduction hot rolling of a slab product.

In addition, by minimizing the amount of solid waste generated during the rolling processes of aluminum and its alloys, the method of the present invention substantially eliminates what can be a very negative environmental impact involving disposal of copious quantities of solid waste generated when ground work rolls or work rolls textured with any of the other prior art work roll surface textures, e.g., annular crater, asymmetric hump, or otherwise, are employed in rolling processes.

Another objective of the invention is to reduce coil handling time and the number of passes to obtain commercially desirable product thicknesses.

Yet another objective of the invention is to increase the life of work rolls. Because work rolls have heretofore had ground finishes, the surface wear rate was often high, as the surface roughness was high. Further, changing rolls and regrinding worn work rolls adds to total production costs. The textured work rolls of the present invention have a much lower wear rate, resulting in a substantial increase in service life and reduced costs.

A further objective of the invention is to substantially reduce adhesive metal transfer from the slab surface to the roll surface and to substantially reduce subsequent retransfer of slab material from the roll surface to the slab surface, particularly in hot rolling processes where aluminum is the material being rolled. Because of the slow rolling speeds during hot rolling, the elevated temperatures of the roll/slab interface (the slab is typically pre-heated to the 850° F. to 950° F. range and the work rolls are typically maintained at a temperature in the 350° F. to 450° F. range) and the relatively thick slab gauge, a sufficient lubricant film cannot be entrained in the roll bite. This lack of a sufficient lubricant film results in adhesion of slab surface material to the work roll surface and retransfer of the adhered material to regions of the slab surface, some of which regions may have yet to enter the roll bite. Applicants' micron-size ovoid bowls draw small amounts of lubricant into the roll bite that are released to the work roll/workpiece interface, as workpiece material extrudes to partially fill the bowls during the thickness reduction process (FIG. 12).

It is yet another objective of the invention to provide enhanced rolling mill stability in situations where negative forward slip (as discussed and defined hereinafter) prevails and thus skidding of the work roll surface over the strip surface is likely.

It is yet another objective of the invention to provide a strip product in the last stand of massive thickness reduction cold rolling processes that has a raised surface texture (relative to the nominal surface roughness of the strip) that acts to retain lubricant at the interface between the strip product and a forming tool in a secondary forming operation, such lubricant retention being effected by the lubricant barrier effect (as discussed and defined hereinafter).

It is yet another objective to provide a strip product having a surface microtopography whereupon transverse fissure formation is localized to the raised portions of the strip surface texture elements formed during the last stand of massive thickness reduction cold rolling, rather than being randomly formed on the substantially larger background (i.e. untextured) surface of the strip (which random formation otherwise occurs when a ground roll surface is employed). In the present invention, such background surface is uniformly smeared by the substantially smooth regions of the work roll surface that surround the individual ovoid bowls such that the image clarity and glossiness of the final strip product are dramatically enhanced beyond what is otherwise possible with ground roll surfaces or other existing roll textures.

BRIEF DESCRIPTION OF THE DRAWINGS

The invention, along with its objectives and advantages, will be better understood from a consideration of the following detailed description and the accompanying drawings in which:

FIGS. 16 and 17 show the gradual increase in height of the backwards prows of the strip surface prior to the time when the strip surface region shown reaches the vicinity of the roll bite neutral plane, the more prominent prow geometry of FIG. 17 lying deeper within the roll bite than the shallower prow geometry of FIG. 16 (which is closer to the entry plane of the roll bite); FIG. 18 shows the mound strip surface morphology which lies on a region of the strip surface that is deeper into the roll bite than those of either regions of the strip surface shown in FIGS. 16 and 17 and in the vicinity of the neutral plane; FIG. 19 shows a single asymmetric mound on a region of a strip surface that is in the exit plane of the roll bite, such asymmetric mound texture emerging as the final strip surface texture surrounded by a substantially smooth, fissure-less background, and generally displaying (albeit in reverse) the ovoid bowl work roll texture morphology of FIG. 11.

DETAILED DESCRIPTION OF THE PREFERRED EMBODIMENTS

Figure 1:
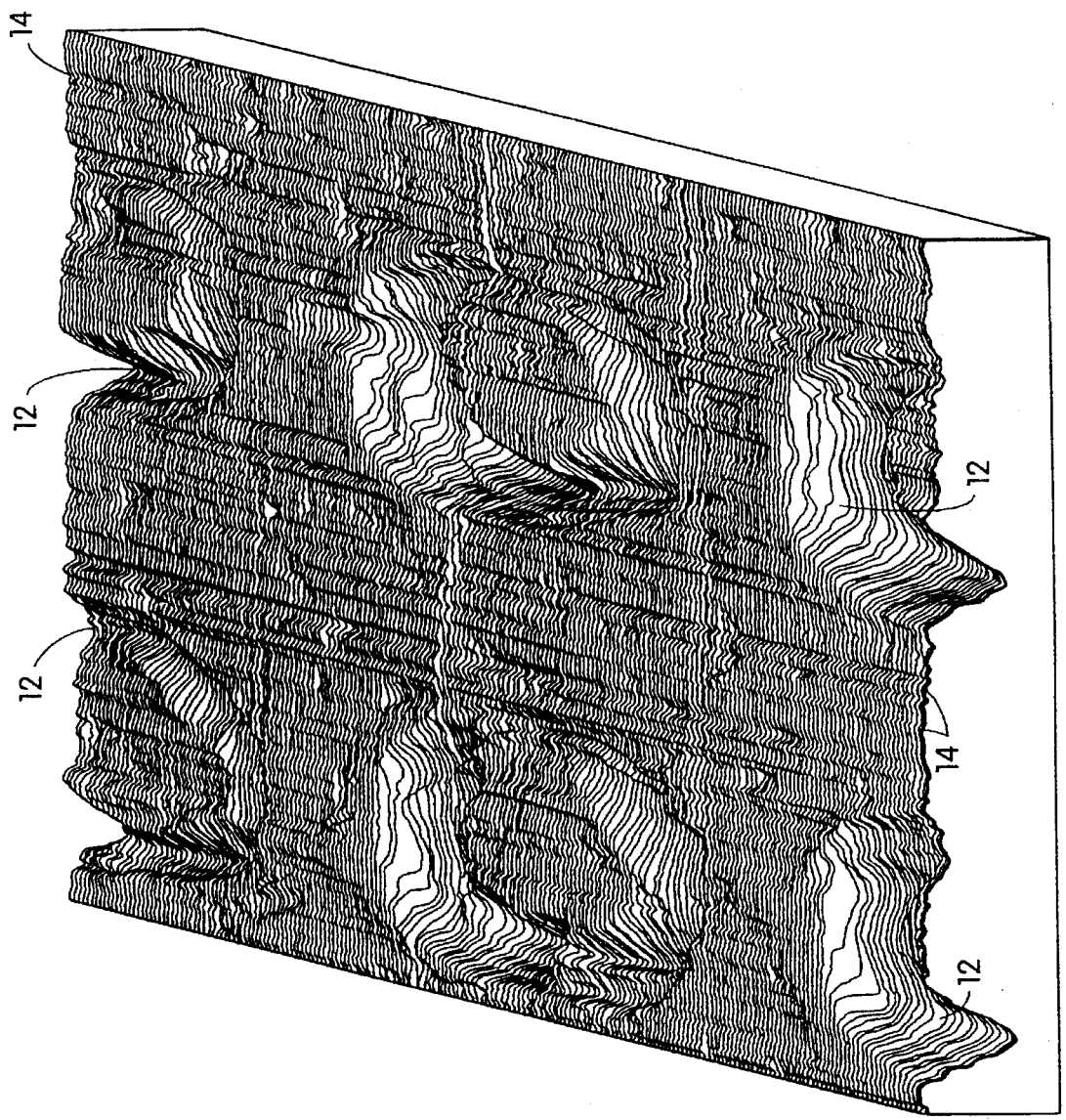
FIG. 1 is a stylus-rendered topography of an aluminum strip surface embossed with a crater texture on a work roll surface.
Figure 2A:
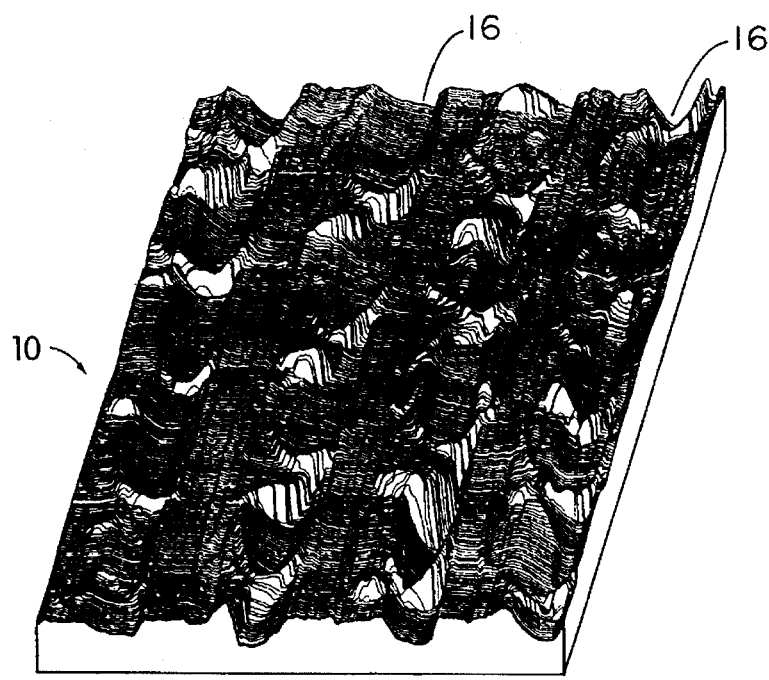
FIGS. 2a and 2b are stylus-rendered topographies of aluminum strip surfaces that have undergone, respectively, 35% and 60% reductions in a rolling mill using the asymmetric hump texture of FIG. 3.
Figure 2B:
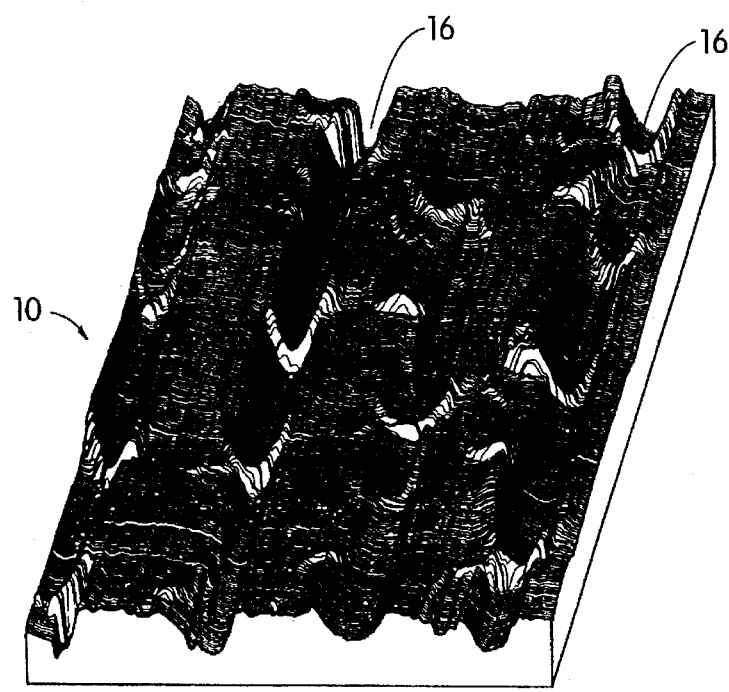
Figure 4A:
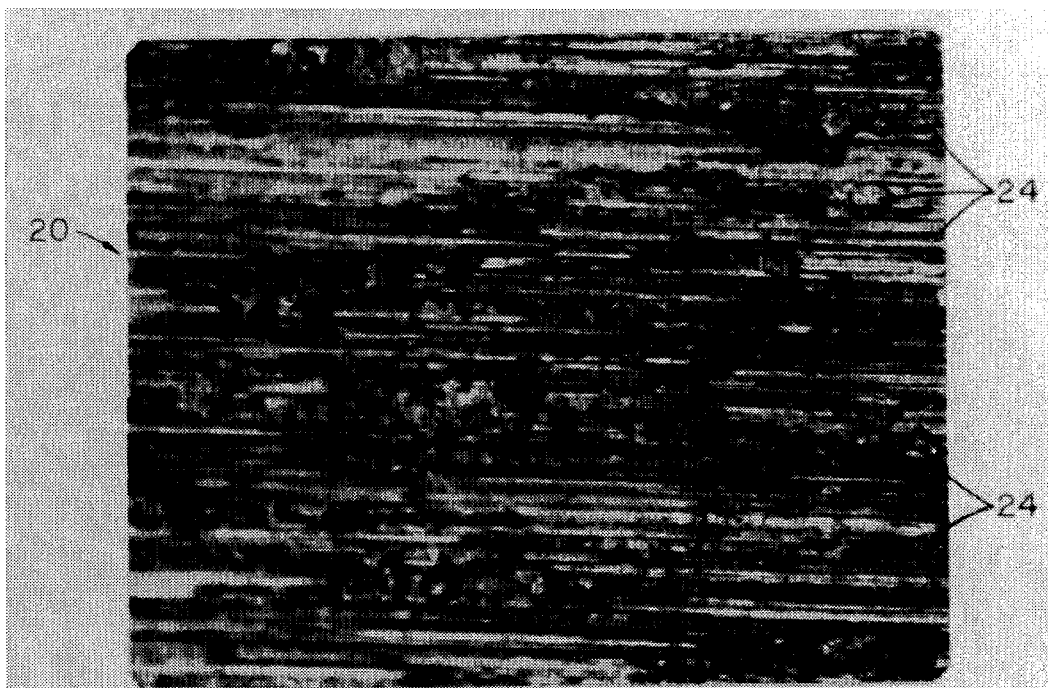
FIG. 4a is a photomicrograph of a surface of a ground steel work roll magnified 200 times showing significant pickup from hot rolling a slab of aluminum alloy 5182 rolled at 50% reduction.
Figure 4B:
FIG. 4b is a photomicrograph of a surface of a slab of aluminum alloy 5182 magnified 200 times showing retransfer of roll surface pickup during hot rolling at a 50% reduction in thickness.
Figure 4C:
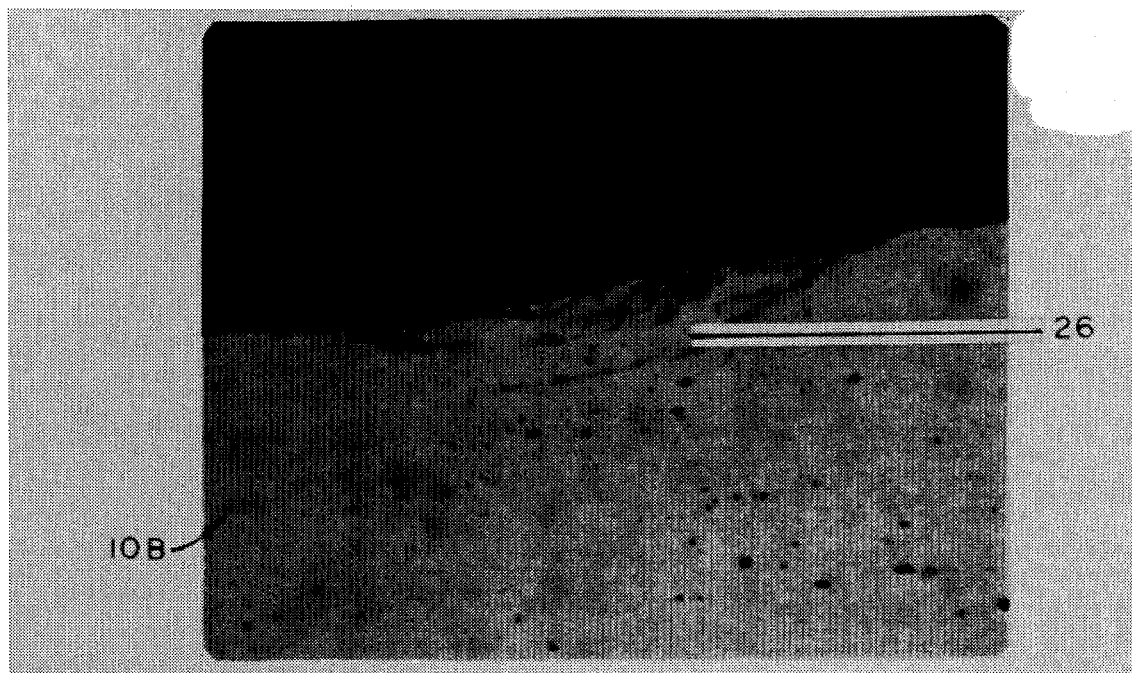
FIG. 4c is a photomicrograph at 500×of a cross-sectioned slab that shows pickup on the surface of the slab.
Figure 5:
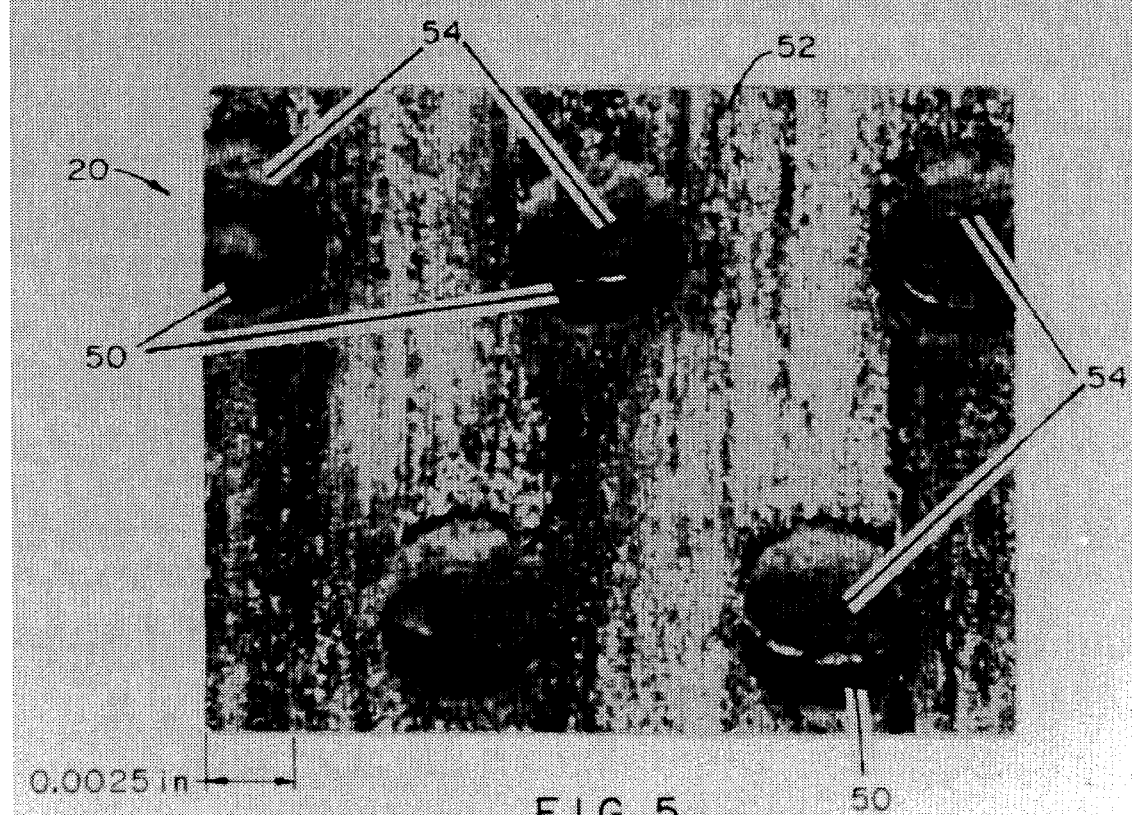
FIG. 5 is a photomicrograph of a steel roll surface magnified 200 times showing strip material seized by an hemispherical bowl texture provided in a work roll surface.
Figure 6:
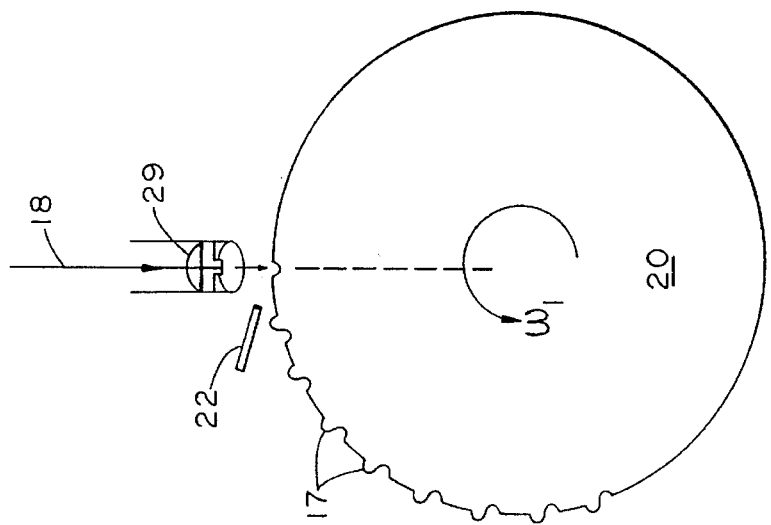
FIG. 6 shows a diagrammatic rendition of a mechanically-chopped laser striking a work roll surface at normal incidence, with an air assist aimed at oblique incidence to the roll surface, which produces the roll surface texture shown in FIG. 3.

Some reference has already been made to FIGS. 1 to 5 of the drawings, as these figures and that of FIG. 6 represent prior practices, which the present invention is a substantial improvement thereover. FIG. 1, for example, shows the rolling results (a strip surface 10) due to rolling with a work roll (not shown) provided with annular craters having raised circular rims that form when an intermittent laser beam strikes the surface of the roll surface at normal incidence, the raised rims forming circular depressions 12 in the strip surface during very light thickness reduction rolling processes (e.g 0.5% to 3% thickness reductions). When annular craters with raised rims are formed on a roll surface that has been previously ground, the ground finish, being directional, leaves longitudinal grind lines 14 on the strip surface, also seen in FIG. 1, since the craters cover only a small percentage (e.g. less than 20%) of the work roll surface area. The embossed texture is therefore superimposed onto a substantially rough background surface.

Figure 3:
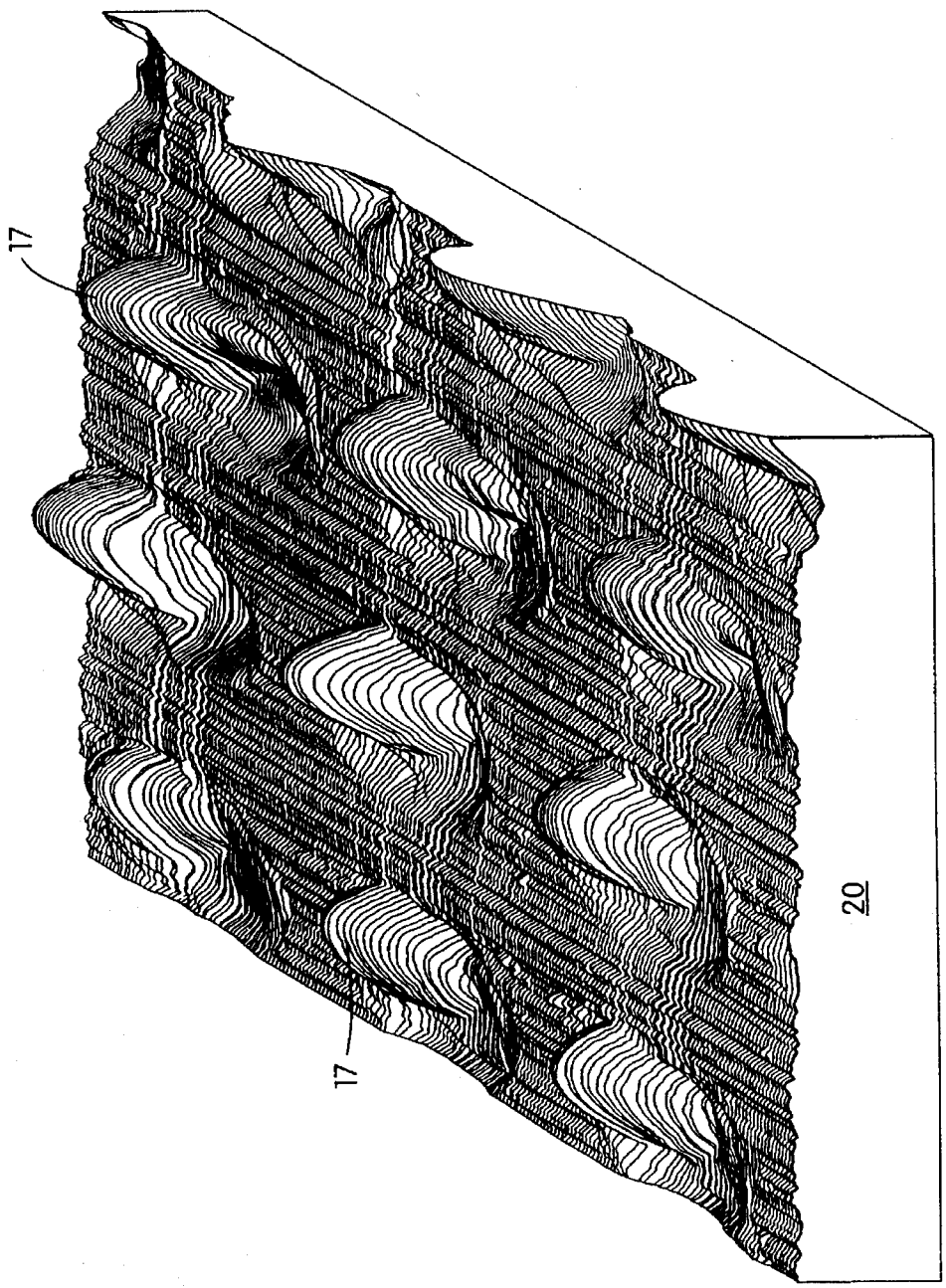
FIG. 3 is a stylus-rendered topography of a work roll surface having an array of asymmetric humps provided by a mechanically-chopped $CO_2$ laser beam and associated oblique gas assist.

As explained earlier in regard to FIGS. 2a and b, the hump texture shown in FIG. 3 produces a smearing effect on a strip surface 10 rolled at substantial thickness reduction ratios (35% and 60% in the case of FIGS. 2a and b), the smearing creating, again, a longitudinal directional pattern 16 which promotes lubricant channeling in secondary forming operations, such as stamping, drawing, and ironing, rather than the desired lubricant retention effect. The longitudinal surface texture pattern 16 promotes anisotropic friction characteristics where friction levels differ with direction along the tooling/workpiece conjunction in a secondary forming process. This is not a desired effect in most secondary forming processes such as stamping or deep drawing. A similar smearing phenomenon to that shown in FIGS. 2a an 2b is encountered when a work roll having the aforementioned annular crater texture is used in normal thickness reduction hot rolling processes and massive thickness reduction cold rolling processes.

The hump texture shown in FIG. 3 and identified by numeral 17 is produced by a laser beam 18 (FIG. 6), directed along the surface normal of a work roll 20 and an oblique gas assist 22. The gas assist serves to laterally displace the molten pool of metal formed as a result of the beam energy density, such a pool then solidifying to form a solid metal hump.

FIG. 4a of the drawings shows the prior problem of metal 24 picked up from an aluminum slab surface 10 and deposited on a work roll surface 20 over a broad area of the roll surface. The "pickup" is retransferred to the slab surface, as indicated by numeral 26 in FIG. 4b. This is all due to adverse tribological conditions in the roll bite during hot rolling with work rolls having a ground finish. FIG. 4c shows metal pickup in a cross-sectional view redeposited on the surface 10 of an aluminum slab 10B after hot rolling.

Figure 8:
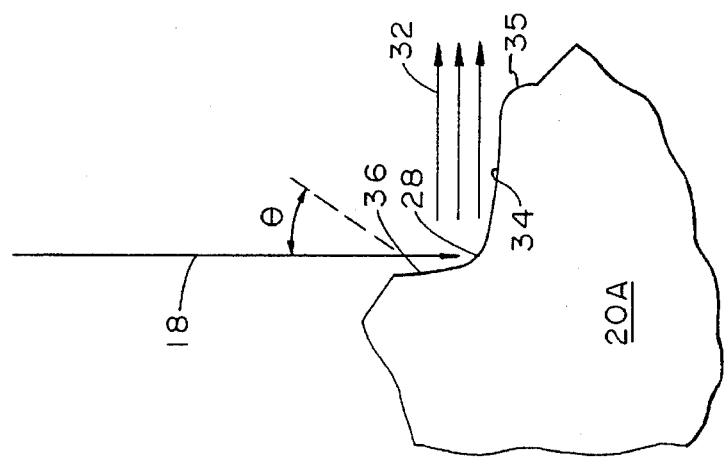
FIG. 8 is an enlarged view of the process that creates the ovoid bowls in FIG. 7.
Figure 7:
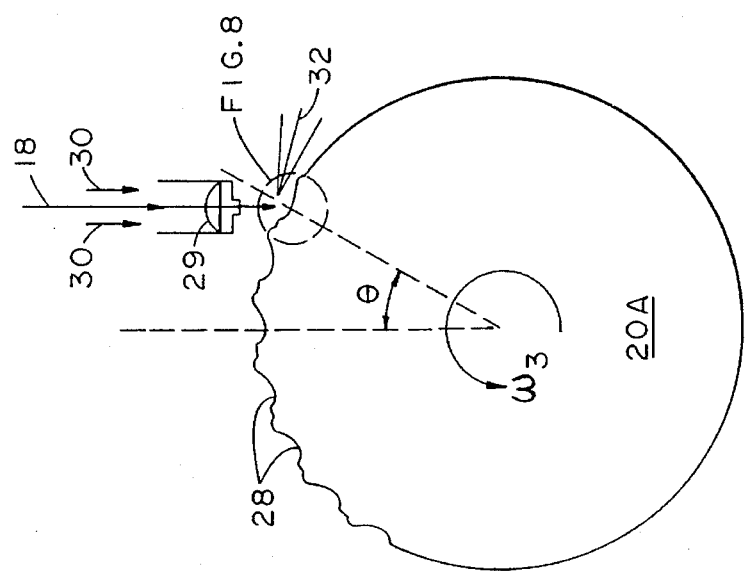
FIG. 7 shows the oblique laser beam texturing technique of the present invention, a technique that permits normal slab thickness reductions in hot rolling processes within the aforementioned rolling speed range as well as massive thickness reductions in a cold rolling process, with an air assist co-axial with the laser beam.
Figure 11:
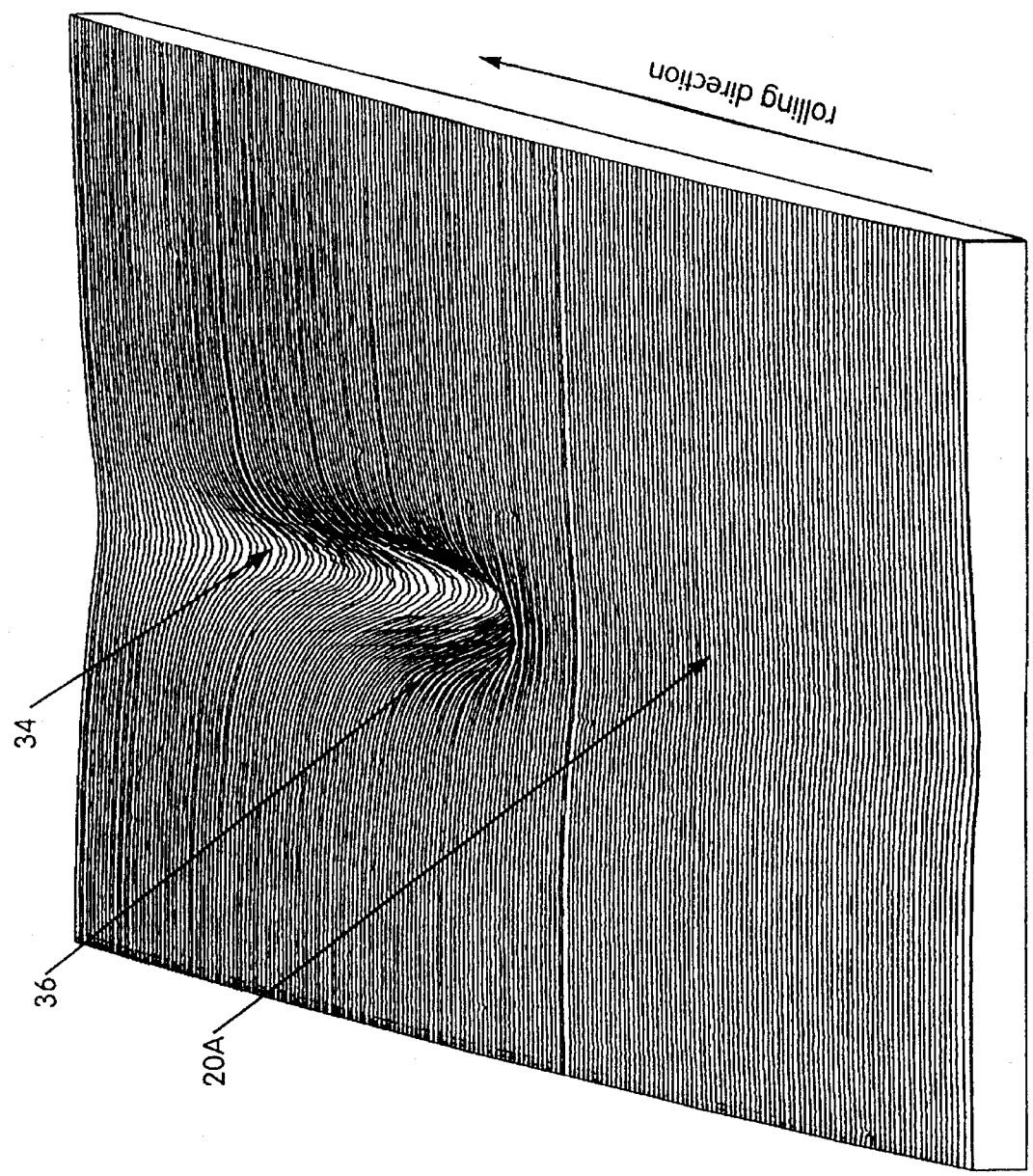
FIG. 11 is a stylus-rendered topography of a single ovoid bowl on a work roll surface after a post-texturing polishing operation to remove material pile-up, such as that shown in FIG. 10.

The present invention provides tribological conditions in a roll bite that substantially avoid the above problems. This is accomplished by forming ovoid (oval-shaped) depressions 28 (FIG. 9) in the surface of a work roll 20A (FIGS. 7 and 8) that has been pre-finished with a fine grinding or polishing operation to substantially minimize the appearance of grind lines 14, as best seen in FIG. 11 of the drawings. The ovoid depressions can be formed in roll 20A as it is rotated relative to a stationary laser beam 18 (arrow 18 in FIGS. 7 and 8) directed at oblique incidence to the roll surface normal, the angle of incidence θ from the roll surface normal being about ten to thirty degrees (FIG. 8). This requires that the roll surface normal form an angle with the beam axis and delivery optics 29, hence, either the roll or the beam must be translated (through a very short distance) relative to each other prior to the commencement of the texturing process. The beam makes elliptical spots on the roll surface since incoming light rays are angled relative to the local surface normal. As roll material is melted and removed by a coaxial gas assist 30, heat from a single pulse of laser energy works especially hard on the end of bowl 28 that lies beneath the point of initial impingement of the beam on the roll surface. This end of the bowl, as it evolves, will have the steepest slope, as shown in FIG. 8. This slope is labeled 36.

Beam 18 is provided with a gas assist 30 (represented only by arrows 30 in FIG. 7) that is coaxial with the beam such that melting and plasma products 32 (FIG. 8) produced by the beam impacting the roll surface are blown into the rotational direction $\omega_3$ of the roll. This heats the roll to the point where melting of additional roll surface material occurs. Because of the angle at which melted products are directed and the fact that they begin to cool down once they leave bowl 28 as it evolves, a shallow end 34 (FIG. 8) of the bowl is created and a pileup 35 of roll material occurs at the shallow end of the bowl. A single ovoid bowl therefore has an asymmetrical internal cross-section in the shape of a built-in swimming pool in that one end has a slope 36 relative to the nominal work roll surface that is substantially steeper than the slope 34 of the opposite end, relative to the work roll surface.

Figure 9:
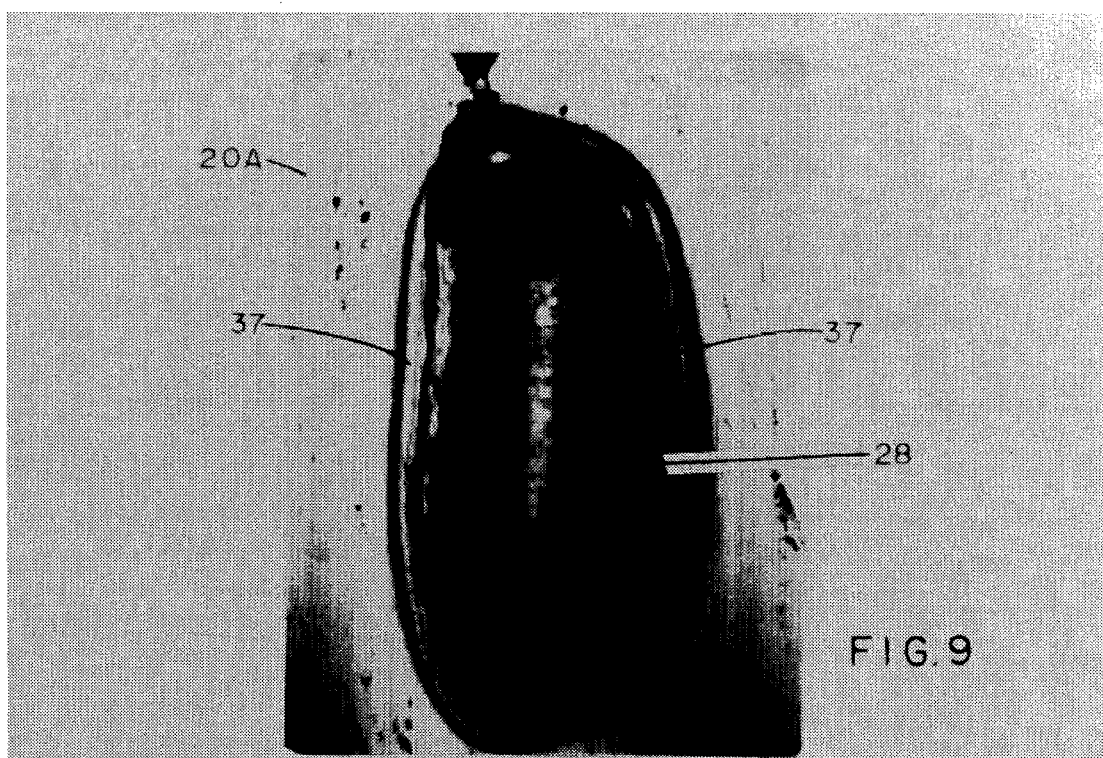
FIG. 9 is a photograph of a roll surface enlarged to show an ovoid bowl formed by the technique shown in FIGS. 7 and 8 prior to removal of lip material from the banks of each bowl.
Figure 10:
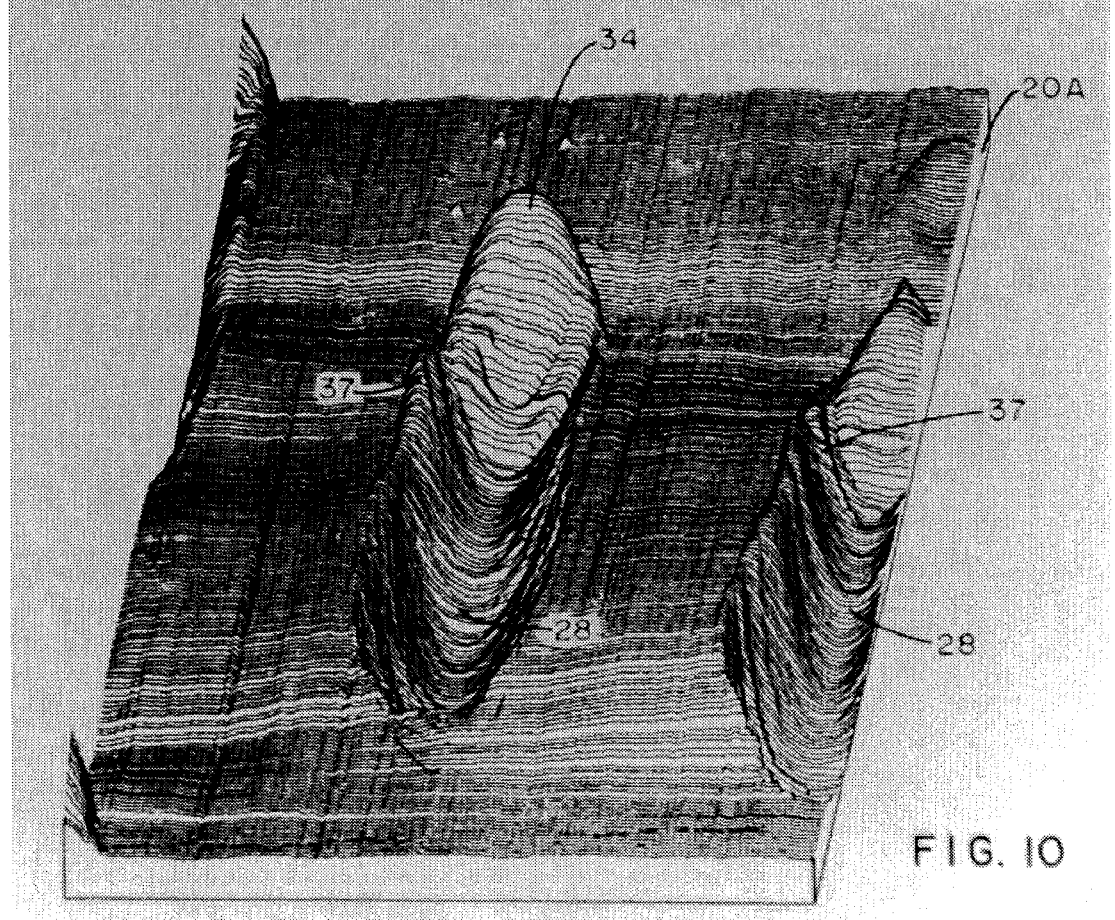
FIG. 10 is a stylus-rendered topography of an ovoid bowl before rim material is removed by polishing.

By using a low gas pressure, i.e., on the order of ten psi, a small quantity of material pileup 37 also forms generally along an edge of the bowl, as seen in FIGS. 9 and 10. If coaxial gas pressure is high, i.e., on the order of sixty psi, then most of the melting/plasma products are expelled from the evolving bowl and, hence, minimal pileup or lip formation results.

The technique of the above Bragard et al patent requires that the focused energy beam be directed along the roll surface normal, and hence strike the work roll surface at normal incidence, as indicated in FIG. 6 of the drawings. Hence, an ovoid bowl texture does not result from this process and the aforementioned benefits associated with the application of the asymmetric hump texture of FIG. 3 in both normal thickness reduction hot rolling and massive thickness reduction cold rolling of aluminum and its alloys cannot be realized with the Bragard et al texture. The technique of the above Bragard et al patent also uses an inert gas to minimize the potential for oxygen embrittlement of humps 17, as the material of the humps solidifies. The humps must, therefore, retain a high level of toughness since they will be used to emboss a steel strip using light reductions. In contrast thereto, the use of an air assist in the present invention will embrittle the asperities or rims 35 and 37, thereby causing them to prematurely fracture during rolling. In the present invention, such asperities are removed by polishing after the texturing process, leading to the rimless texture shown in FIG. 11 of the drawings. Embrittlement of asperities is therefore inconsequential, and the less expensive air assist can be used over that of the inert gas assist of Bragard et al.

A topographical rendition of a single ovoid bowl prior to roll polishing is shown in FIG. 10. A topographical rendition of a single ovoid bowl 28 after the post-texturing polishing operation is shown in FIG. 11. The interior geometry (i.e. beneath the nominal work roll surface) of the polished ovoid bowls is similar to the track of a comet as the comet strikes the earth and comes to rest. The shallow region 34 of the bowl (as indicated in FIG. 11) resembles that region of initial impact between the comet and the earth, where the comet retains much of its descent velocity, as it begins to plow beneath the nominal surface of the earth. The deep region 36 of the bowl resembles that region where the comet has encountered a significant mass of earth material so as to halt forward progress of the comet. A comparison of the texture in FIG. 3 (the Bragard et al. patent) with the ovoid bowl texture of FIG. 11 reveals not only key morphological differences between the two textures, and hence key differences in the applications for which each is intended, but also reveals important differences in the methods by which the textures are applied to a work roll surface. The workpiece surface texture (as it appears after the final stand of massive thickness reduction cold rolling) due to the Bragard et al. texture resembles the directional, channel-like textures shown in FIGS. 2a and 2b of the present invention. The workpiece surface texture rolled under the same conditions with the method of the present invention consists of an array of substantially non-directionally positioned raised asymmetrical mounds 44 (FIGS. 12 and 19) due to backwards extrusion of microscopic quantities of workpiece material into the ovoid bowl work roll texture.

It will be noted from FIG. 10 that the bottom surface of an ovoid bowl 28 may not be smooth. Rather, it may display a slightly rippled appearance due to the movement of molten metal beneath the beam pulse, as roll 20A rotates through the pulse. This artifact of the texturing process does not in any way adversely affect the rolling process or the quality of the strip surface upon exiting a roll bite since strip material extruded into the bowl does not come into substantial contact with the rippled surface at the bottom of the bowls because of the presence of a very thin lubricant film 48 (FIGS. 12 to 15) within each of the bowls.

The length of the bowls of the invention in the rolling direction, i.e., in the longest span of the bowls, falls in the 80 to 300 micron range. The width of the bowls along the roll axis falls in the 75 to 250 micron range. The circumferential center-to-center spacing between adjacent ovoid bowls on the roll surface typically lies in the 175 to 3000 micron range (0.007 inch to 0.12 inch). Typical axial or lateral center-to-center spacings lie in the 254 micron to 2540 micron range (0.01 inch to 0.10 inch). These dimensions provide the average work roll with thousands of ovoid bowls 28. The angle of the shallow region relative to the nominal work roll surface lies in the 5° to 15° range. The angle of the deepest region relative to the nominal work roll surface lies in the 16° to 70° range.

The textured work roll surfaces, as thus far described, are specifically engineered to address normal thickness reduction hot rolling processes, as well as massive thickness reduction cold rolling processes involving aluminum and its alloys during high speed cold rolling, or hot rolling at much slower speeds.

The following discussion pertaining to the evolution of workpiece surface topography describes workpiece surface texture formation during both cold and hot rolling processes, although the texture on the surface of the slab during hot rolling may be substantially less prominent than that on a strip surface rolled during massive thickness reduction cold rolling. In addition, any slab surface texture formed during hot rolling will typically be obliterated during later stages of rolling of the slab to a strip, whereas, massive thickness reduction cold rolling in the last stand produces the strip texture shown in FIG. 20 of the drawings.

Figure 12:
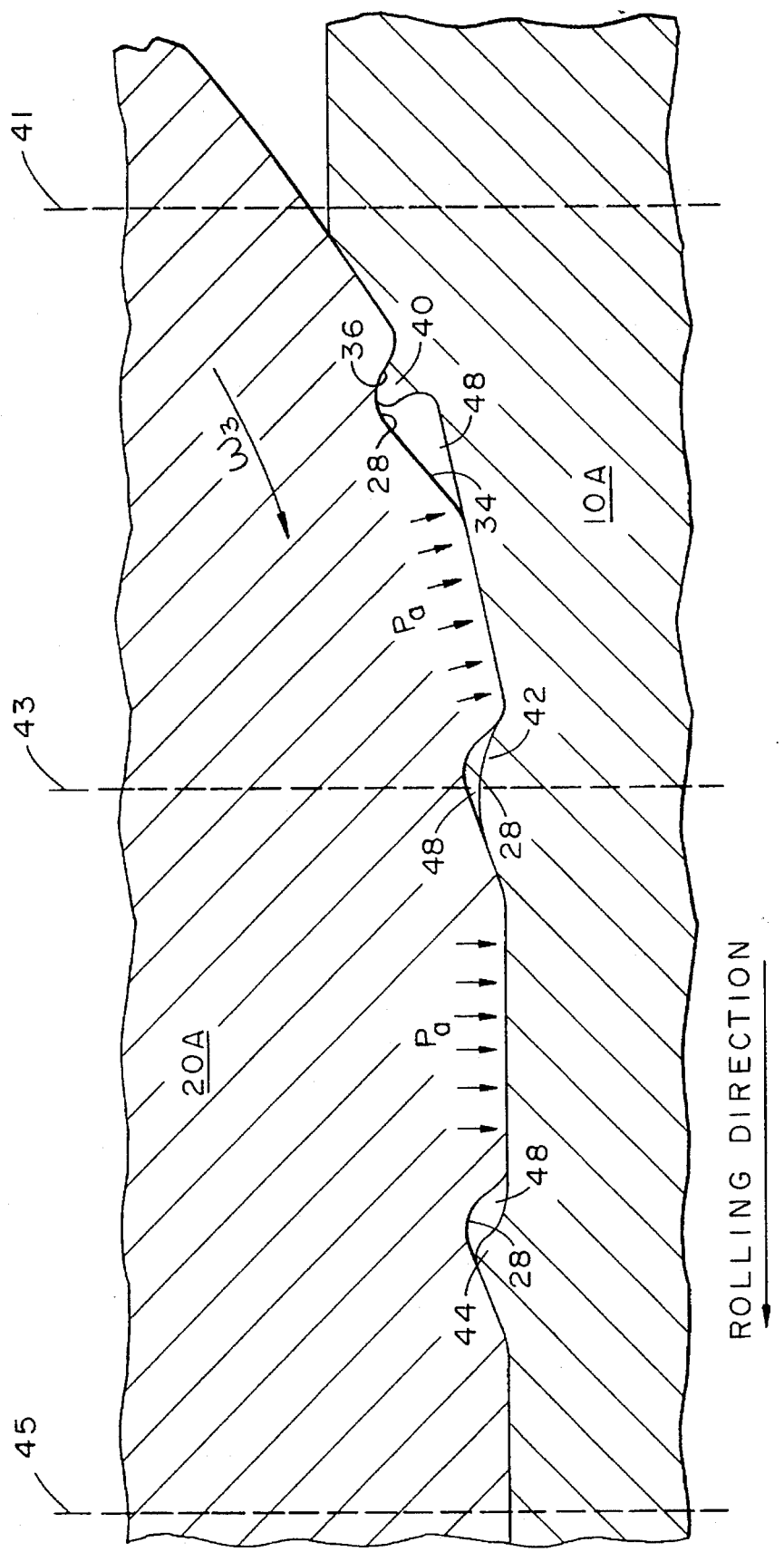
FIG. 12 is a composite view of the transient nature of a strip surface within the roll bite of a massive thickness reduction cold rolling process employing a work roll with the ovoid bowl texture of the invention, as shown in FIG. 11, FIGS. 13 to 15 show a plastic wave effect on a strip surface during massive thickness reduction cold rolling with ovoid bowls in the three main regions of the roll bite, viz., the entry region (FIG. 13), the vicinity of a neutral plane (FIG. 14), and the exit plane (FIG. 15)

The texture morphology on a workpiece surface in the three main regions of a roll bite due to a work roll 20A having the ovoid bowl surface texture, where each bowl is substantially identical to the surface texture depicted in FIG. 11, is shown in FIG. 12. FIG. 12, which is intended to emphasize the transient nature of the workpiece surface during rolling with the ovoid bowl texture, can be thought of as a snapshot of the workpiece surface morphology in the roll bite. The workpiece surface texture does not result from direct embossing of the roll texture onto the workpiece texture, as is the case during formation of the annular crater strip surface texture in FIG. 1. Rather, workpiece surface texture formation is governed by the kinematics in the roll bite, which involves significant sliding and consequent smearing of the strip 10A in conjunction with the normal load Pa exerted by the work roll surface on the workpiece surface during massive thickness reduction cold rolling or normal thickness reduction hot rolling. The work roll surface is presumed to be rigid, and plastic deformation of the workpiece surface results from the controlled morphological deviations in the work roll surface topography in the form of an array of ovoid bowls 28.

Continuing with FIG. 12, the size of bowls 28 has been exaggerated solely for the purpose of illustration. The region of an ovoid bowl with mild slope 34 enters into the roll bite first, as roll 20A rotates in the rolling process, followed by the end which has the steeper slope 36. Trailing end 36 serves to drag residual lubricant 48 into the roll bite. Small quantities of workpiece surface material 10A partially extrude into the bowls in the entry region of the roll bite, in the vicinity of the neutral plane of the roll bite and in the exit plane of the roll bite. The geometries of the workpiece surface texture in each region differ due to the kinematics of the roll bite and associated normal loads $P_a$ in a given region. Forward prows 40 of workpiece material are formed in those bowls momentarily in the entry region and just prior to the vicinity of the neutral plane. Raised mounds 42 of workpiece material are formed on that portion of the workpiece surface that is proximate to or within the neutral plane region (indicated by dash line 43). Finally, asymmetrical mounds 44 form in the exit region, and this is the texture that remains on a strip product after it leaves the last stand of a massive thickness reduction cold rolling operation. The first two workpiece surface textures exist only momentarily on the workpiece surface since they are smeared forward, as the workpiece surface proceeds through the roll bite. Smearing phenomena is described in some detail in Applicants' U.S. Pat. No. 5,025,547.

Figure 13:
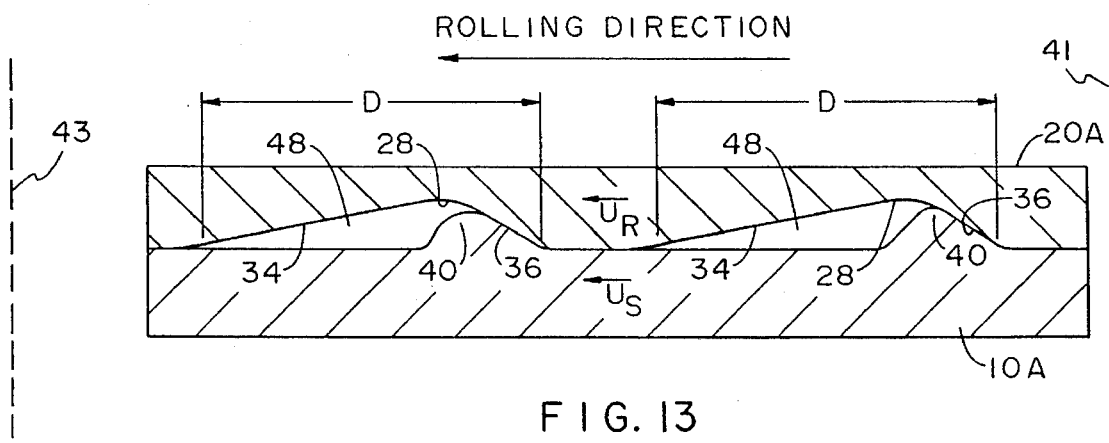
Figure 14:
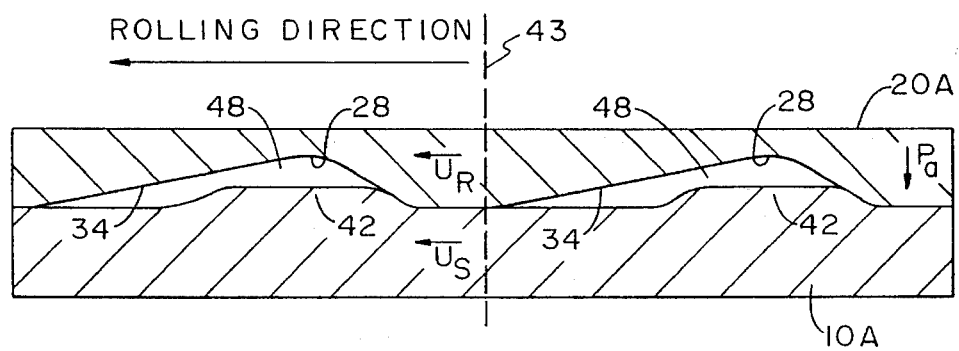
Figure 15:
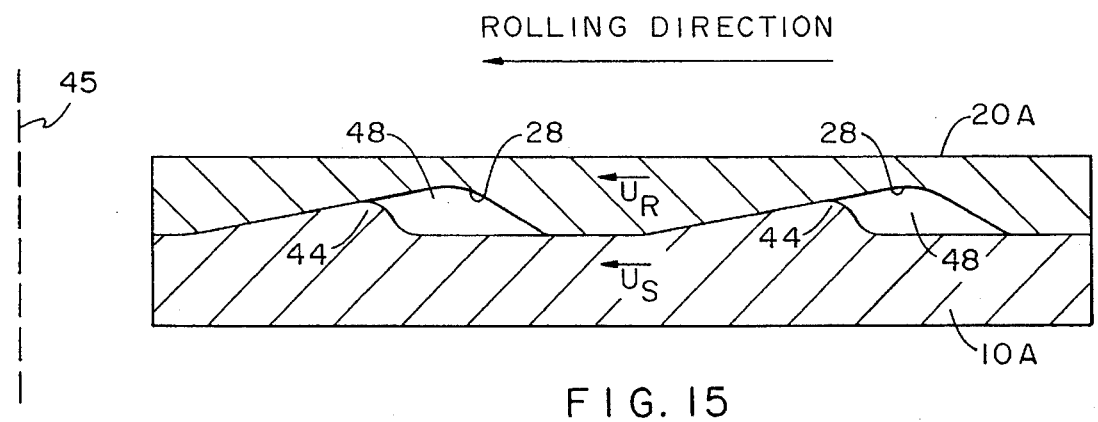

FIGS. 13 to 15 are three additional schematic renditions of the three regions of the deformation of workpiece surface 10A depicted in FIG. 12. Each of FIGS. 13 to 15 examines two bowls 28 in the region of the roll bite for the purpose of illustration (whereas only a single ovoid bowl was considered in each of the three regions of the roll bite of FIG. 12). The length of each bowl in the circumferential direction is indicated by the letter "D". The roll surface speed $U_R$ exceeds that of the workpiece surface speed $U_s$ in the entry region during massive thickness reduction cold rolling and to a lesser extent during normal thickness reduction hot rolling. Since this is the case, as the workpiece 10A passes into the roll bite, workpiece material is extruded into the bowl and then smeared against the trailing edge 36 of the bowl, which edge has the steeper slope, thereby resulting in forward prows. This is shown in FIG. 13 and in the entry zone in FIG. 12.

As workpiece 10A moves into the region of the neutral plane, the prows 40 formed in the entry region are smeared forward and then flattened. Partial mounds 42 then form, as shown in FIG. 14o In this region, the surface speeds of the workpiece and work roll are substantially equivalent and the normal rolling pressure $P_a$ is the dominant influence. Hence, strip surface material partially extrudes into the ovoid bowls since there is minimal smearing due to a minimal velocity gradient across the roll/workpiece interface.

As the workpiece surface exits the neutral plane, the partial mounds 42 in FIG. 14 are smeared backward and evenly flattened as the workpiece surface speed exceeds that of the roll. The workpiece surface now begins to adopt the asymmetrical mound texture 44 due to the mechanism shown in FIG. 15. The workpiece material that extrudes into each bowl in the exit region is smeared against the leading edge of each bowl which has the milder slope 34. This results in an asymmetric mound that has a leading slope that is also quite gradual, followed by a plateau region which represents the highest portion of the mound (relative to the nominal workpiece surface).

The process by which asymmetric mounds are formed on the workpiece surface in the exit region of the roll bite demonstrates a major benefit of rolling with the ovoid bowl texture relative to reduced wear debris generation and the minimization or even prevention of adhesion and/or seizure of slab surface material into the roll texture during hot rolling, as explained hereinafter. Micro-machining of a slab surface (10B in FIG. 4c), as well as seizure during hot rolling (FIG. 5) is substantially eliminated in the exit region since extruded slab material is smeared along the gentle inner slope 34 of each ovoid bowl 28, instead of being sheared by a sharp, inner edge 36. The reason for this pertains to the influence that deformation of the slab substrate (or bulk) has on surface deformation of the slab, and the manner through which this influence manifests itself as a mitigating factor for wear debris generation. In the entry zone of the roll bite, both the slab surface and the slab substrate are deforming plastically and hence lateral strain rates (i.e. in the rolling direction) of both are nearly equivalent. It is within the entry region that the bulk of the slab begins to be reduced in thickness by the work roll surface. The work roll surface speed is greater than the slab surface speed and hence slab surface material 40 (using FIGS. 12 and 13) is extruded into bowls 28 and then smeared against the rear (steeper slope end 36) of the bowls. As such, the extruded surface material is more compliant to the rear (interior) surface (i.e. the steeper slope regions) of the ovoid bowls, and wear debris generation through micromachining of the extruded material by the rear surface of the bowl is thus less likely in the entry zone since the slab substrate material and slab surface material are simultaneously undergoing plastic deformation. In the exit zone, the deformation field in the slab substrate has a substantial elastic component whereas the slab surface material continues to deform plastically. Hence, micromachining with attendant wear debris generation is more likely to occur in the exit zone since the lateral strain rate difference (i.e. in the rolling direction) between the surface material and the slab substrate is substantially larger than what it is in the entry zone. The slab substrate is less compliant, yet the slab surface material continues to deform plastically. It is for this reason that the shallow ends 34 of the bowls enter the hot rolling roll bite first since slab surface material will be smeared against the shallow ends of the bowls (rather than abraded) in the exit region of the roll bite due to the fact that the slab surface now travels faster than the roll surface.

A discussion of the manner in which a workpiece surface deforms relative to the workpiece substrate during rolling processes in the manner just described may be found in "Real Area of Contact and Boundary Friction in Metal Forming ", by W. R. D. Wilson and S. Sheu, *International Journal of Engineering Science*, Vol. 30, pp. 475–489, 1988.

Slab products 10B undergoing hot rolling are even more sensitive to seizure, adhesive metal transfer, and wear debris generation (as previously discussed) due to the elevated temperatures involved in the process. Hence, the hemispherical bowl texture shown in the applicants' pending Application Ser. No. 000,666 (where the slope of the interior of the bowls is substantially constant but steeper than the shallow ends of the ovoid bowls of the present invention) cannot be used during hot rolling of aluminum. This is illustrated in FIG. 5 of the drawings. As seen, circular bowls 50 provided in a roll surface 52 capture hot metal in the form of hemispherical caps or circular discs 54 from a slab (not shown) of an aluminum alloy being hot rolled by roll 52. The captured metal, which partially fills the hemispherical bowls, can be retransferred all or in part to the slab surface during rolling, and rolled into the slab surface to create a surface that, in the final strip product that exits the last stand of cold rolling, is dull and dirty, and rejected by the customer of the product. If the captured slab surface material remains in the bowls, then the ability of the bowls to draw lubricant into a hot rolling bite is dramatically diminished and the aforementioned rolling process and product functionality benefits cannot be realized.

Figure 16:
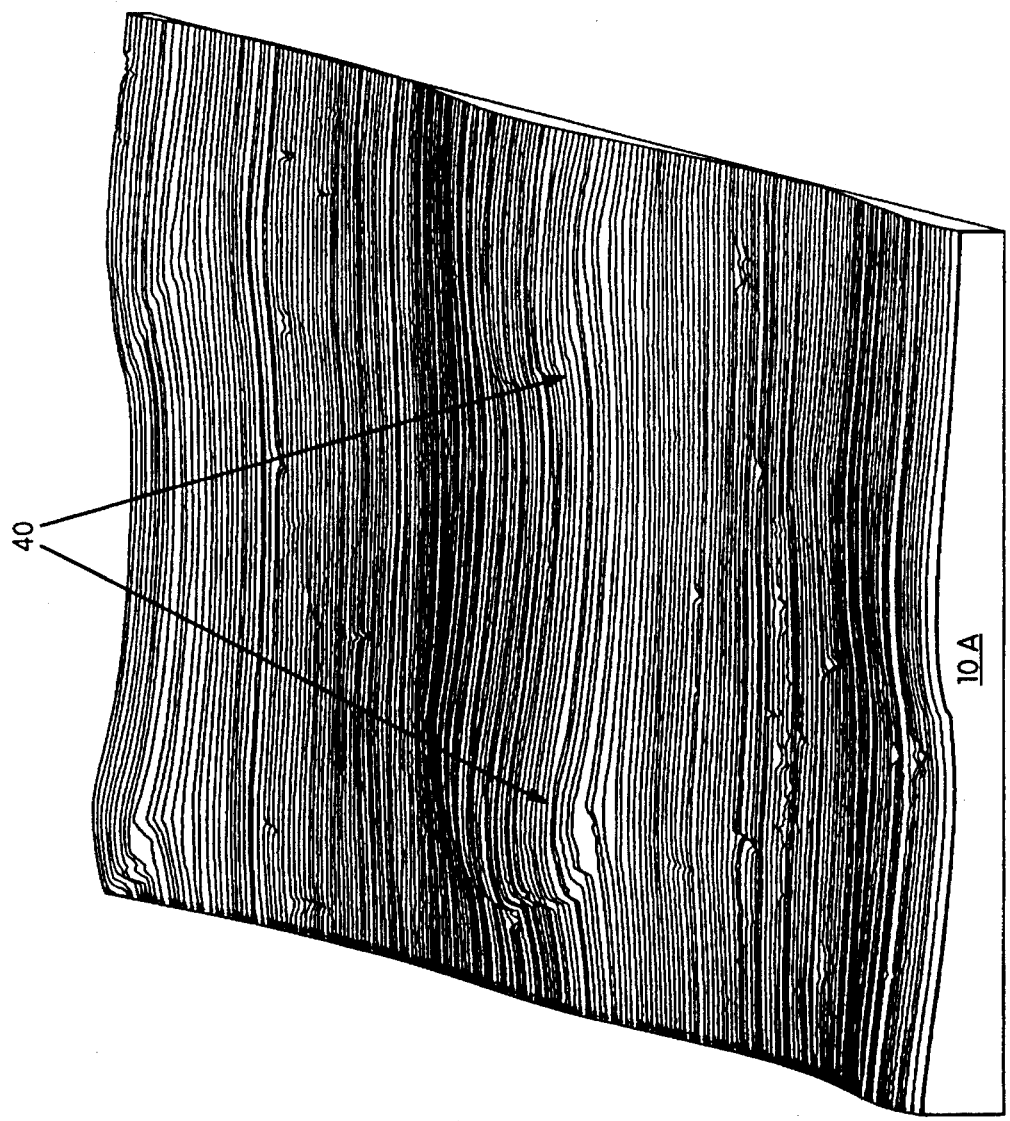
FIGS. 16 to 19 are stylus-rendered topographies showing the current strip surface morphology in the three main regions of the roll bite during rolling of AC 171 aluminum alloy strip surface at 41% thickness reduction in a cold mill using a work roll provided with ovoid bowls; such surface morphologies in each of the three regions are generally representative of those that occur during massive thickness reduction cold rolling processes.
Figure 17:
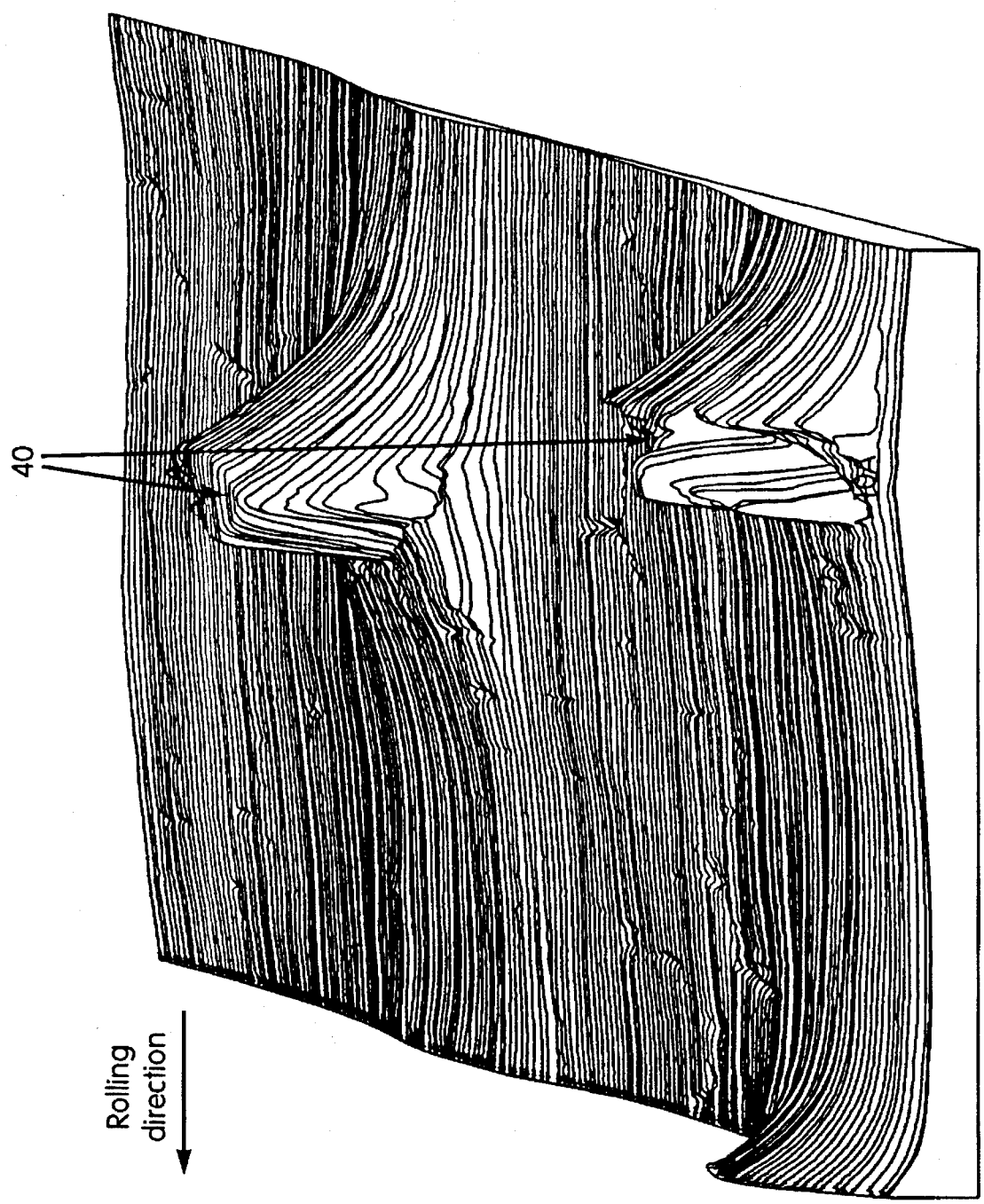

FIGS. 16 to 19 of the drawings are progressions of stylus-rendered topographies of a workpiece 10A surface that occurs when the rolling process of the invention is intentionally interrupted to reveal the evolution of workpiece surface topography. FIGS. 16 to 19 capture the transient nature of the workpiece surface in the roll bite with the ovoid bowl texture of the present invention from a perspective that differs from FIGS. 12 through 15. FIGS. 16 and 17 show the gradual increase in the height of the forward prows 40 formed during the time before the workpiece surface region depicted in these figures reaches the vicinity of the neutral plane. The wave-like geometry of a forward prow is due to workpiece surface material being extruded into an ovoid bowl 28 and then smeared against the trailing end 36 of the bowl, which is the deepest section of the bowl. Note that the height of the backward prows gradually increases since workpiece surface smearing decreases as the workpiece approaches the neutral plane and the normal load $P_a$ transmitted through the roll surface increases. Again, the prows of FIGS. 16 and 17 exist only momentarily on the workpiece surface, as they are smeared and then flattened as the workpiece moves into the region of the neutral plane.

Figure 18:
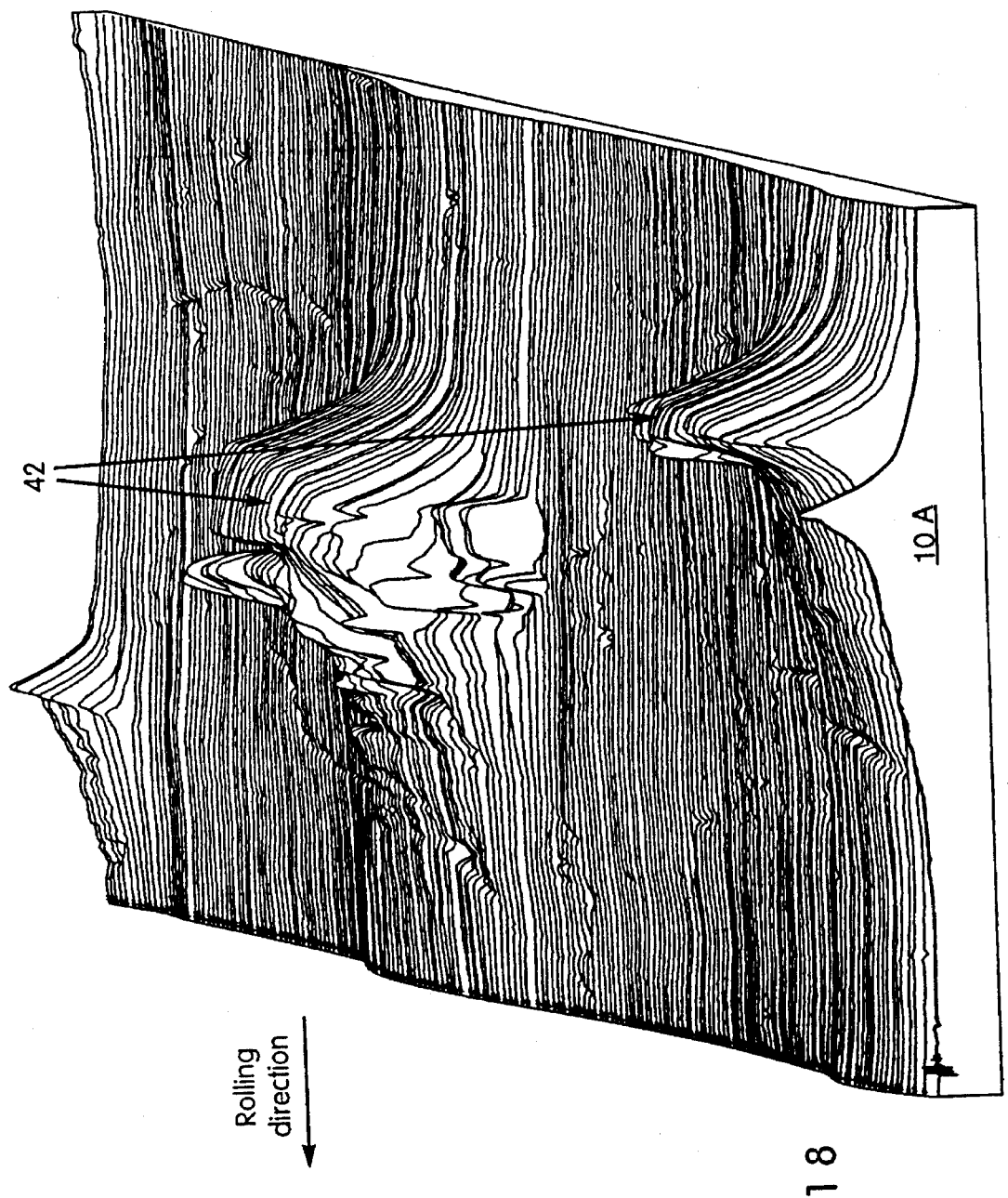

FIG. 18 of the drawings shows the mound texture 42 formed in the vicinity of the neutral plane. The mounds result from the workpiece surface material extruding into the ovoid bowls with negligible smearing. The mounds in this figure also exist only momentarily and are flattened as the workpiece exits the neutral plane.

Figure 19:
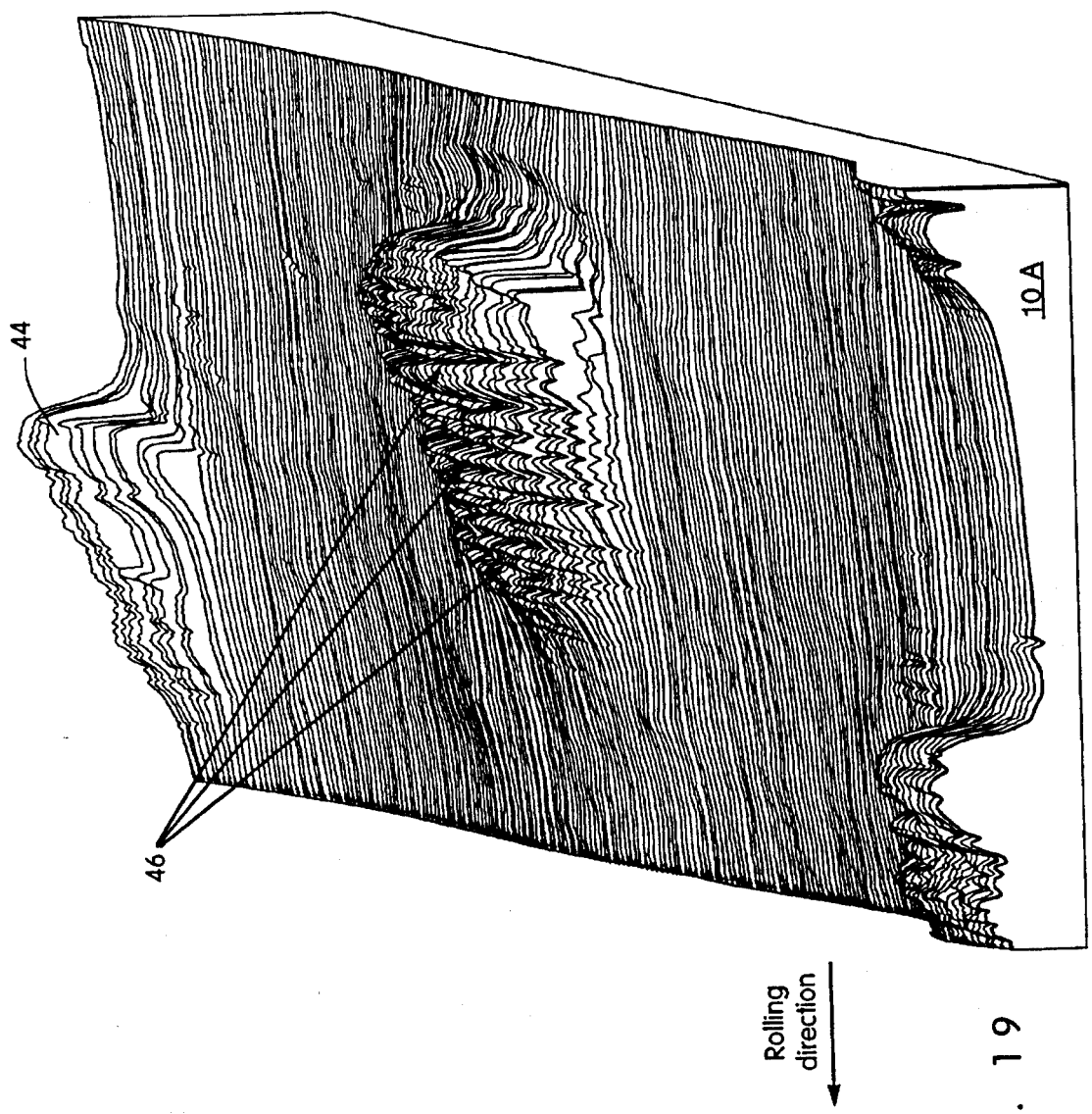
Figure 21:
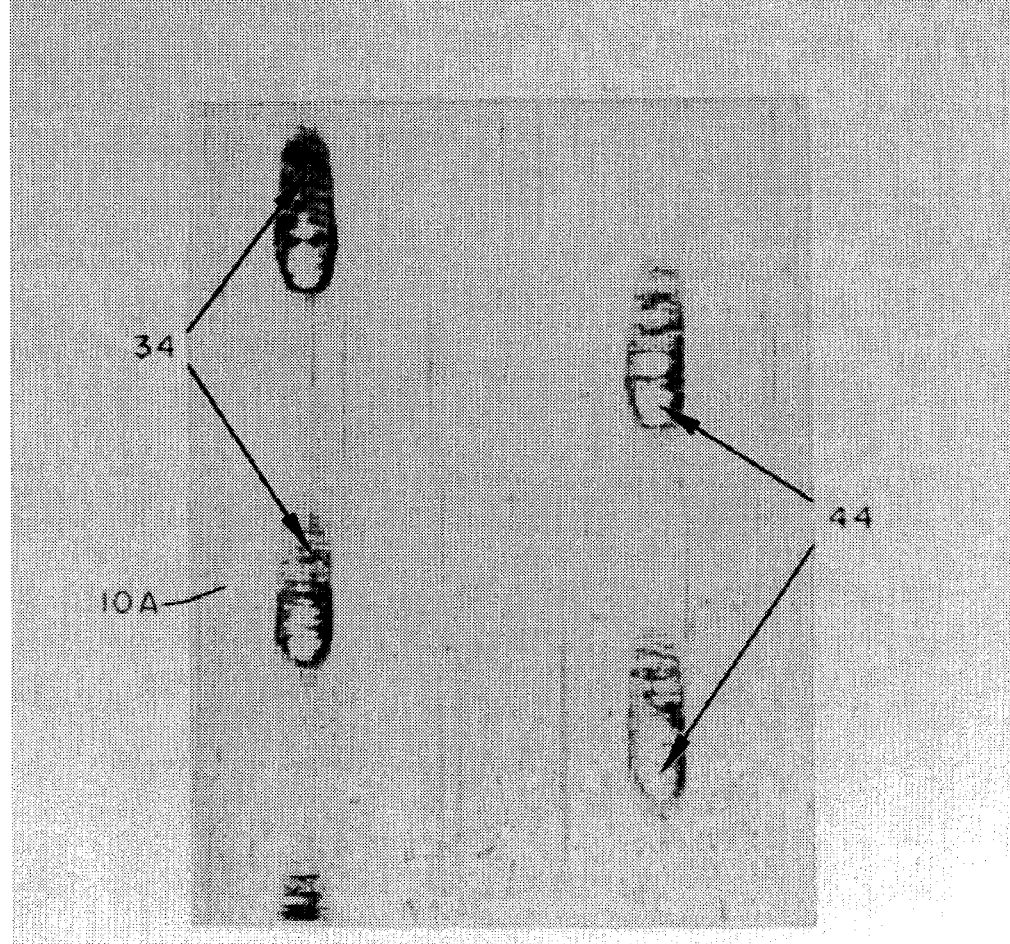
FIG. 21 is a photomicrograph of a top-down view of the corresponding mounds formed on a strip surface rolled by the roll of FIG. 20 at a magnification of 100, such mounds being substantially identical in shape to that in FIG. 19.

FIG. 19 shows the asymmetric mound texture 44 formed after workpiece 10A exits the neutral plane and has entered the exit region of the roll bite. Each asymmetric mound is inclined according to the geometry of the ovoid bowl into which it has extruded. The leading edge of each mound rises up in a ramp-like profile relative to the nominal strip surface roughness and increases to a maximum at its trailing edge. As seen in FIG. 19, the surfaces of the subject asymmetric mounds are replete with transverse fissures 46, and the steepest regions of the workpiece textures in the entry and exit regions of the roll bite always face the neutral plane. This latter fact is a consequence of the reversal of the smearing direction as the workpiece moves through the roll bite. This phenomenon is also visible in the micrograph of FIG. 21. FIG. 21 shows how an array of four mounds that are identical to that depicted in FIG. 19 appears when viewed from above the strip surface as it exits that last stand of a massive thickness reduction cold rolling process. It should be noted that the morphology of the asymmetric mounds differs dramatically from the thin, crescent-shaped backwards prows of the Applicants' pending application Ser. No. 238,249.

Transverse fissure formation on a strip surface during massive thickness reduction cold rolling is limited to the ramped-surfaces of elongated asymmetric mounds 44 and not to the much larger and broader background region of the strip surface that exhibits no substantial texture and hence is substantially planar with a very bright appearance. There is typically a greater concentration of transverse fissures 46 along the mild, leading edge of the asymmetric mounds since thin lubricant films are pressured into a much smaller region than those that exist near the trailing and steeper end of the ovoid bowl, as seen in FIG. 19. (The mechanism of transverse fissure formation due to thin, highly pressurized lubricant films during rolling of aluminum alloys is described in the Applicants' U.S. Pat. No. 4,996,113 entitled "Brightness Enhancement with Textured Roll", issued Feb. 26, 1991) The elongated, asymmetric mounds are surrounded by a background that is highly reflective; the background contains no significant accumulation of transverse fissures, as again evidenced by FIG. 19. Also absent are grinding marks 14 (FIG. 1 ) due to the fact that the roll has been pre-finished prior to the texturing process of the invention. This greatly improves strip glossiness since random transverse fissure formation has been prevented and substantial roll grind marks in the background surface are absent. It is the background portions of the strip surface that control the brightness of the strip, as seen by the human eye.

The evolution of the texture of the present invention in the process of passing through the roll bite using a work roll 20A textured in accordance with the invention guarantees that the amount of wear debris generated is minimal in both hot and cold rolling processes, and that the strip surface will be substantially brighter than a comparable strip rolled with a ground roll surface under identical rolling conditions. Adequate traction in the roll bite is insured by the momentary contact of workpiece material extruded into thousands of minute ovoid bowls 28 located in the working surface of the work roll. The bowls also carry lubricant 48 into the roll bite so that traction and friction are not excessive. FIG. 12 of the drawings shows schematically the residual lubricant 48 contained in the bowls, as it is expelled to regions of the workpiece/roll interface that are proximate to a given bowl and, hence, the interface is effectively relubricated.

Traction along the work roll/backup roll interface (not shown) is controlled through momentary (elastic) extrusion of the softer backup roll material into the ovoid bowls 28 provided in the harder material of the work roll surface. Backup rolls are necessary to effect the massive strip thickness reductions in cold rolling processes, as well as the normal thickness reductions of slab material in hot rolling.

If the ovoid bowl texture is used on work rolls in the final stand of cold rolling, the final strip surface exiting the roll bite (FIG. 19) has a highly desirable impact on product formability in secondary forming operations and customer acceptance, since the texture will function to retain lubricant in the interface between the strip and stamping or other forming tools (not shown). This result is due to a lubricant barrier effect which forces lubricant to flow around the raised asymmetric mounds 44 and hence provides a strip tool interface that retains lubricant for a greater period of time than would otherwise be the case with a ground finish. The lubricant barrier effect is discussed in "An Average Flow Model for Determining the Effect of Three-Dimensional Roughness on Partial Hydrodynamic Lubrication" by N. Patir and H. S. Cheng, ASME *Journal of Lubrication Technology*, Vol 100, pp. 12–17, 1978. When a strip finish having a roll grind pattern is formed into a three-dimensional object in a secondary forming operation, no means is provided to inhibit lubricant flow and thus adequate lubricant films often do not develop during such secondary processes. This leads to adhesive metal transfer, process interruption and an excessive expenditure of energy (to overcome friction). In addition, when a directional finish on a strip surface is transverse to the direction of forming tool motion, lubricant films are retained leading to rough interface appearances, such as bleedthrough or an irregular undercast and looper lines in the case of can forming. These defects in the external surfaces of formed aluminum beverage cans have been discussed in detail in the Applicants' U.S. Pat. No. 5,250,364 entitled "Rolled Product with Textured Surface for Improved Lubrication, Formability and Brightness", issued Oct. 5, 1993. The annular crater texture of FIG. 1 has an added disadvantage in that the recessions (annular regions 12) in the strip may not completely expel the lubricant they entrap in a secondary forming operation, since the texture may not completely vanish from the strip surface. This type of problem does not occur with the asymmetrical mound texture since lubricant merely flows around the texture rather than being entrapped by it, in addition to being carried by the transverse fissures 46 in each texture element 44 formed on the strip surface.

Since ground work rolls have a minimal ability to entrap lubricant in the roll bite, higher roll forces, higher rolling torques and higher forward slip values are experienced relative to the work roll surfaces of the invention. Since ground work rolls require a higher torque to take a given thickness reduction, the ground rolls have a tendency to skid relative to the backup rolls and microslip against the backup rolls. The ground surface of the rolls then becomes shiny, which is a result of the roll surface losing its fine roughness to become polished.

Figure 22:
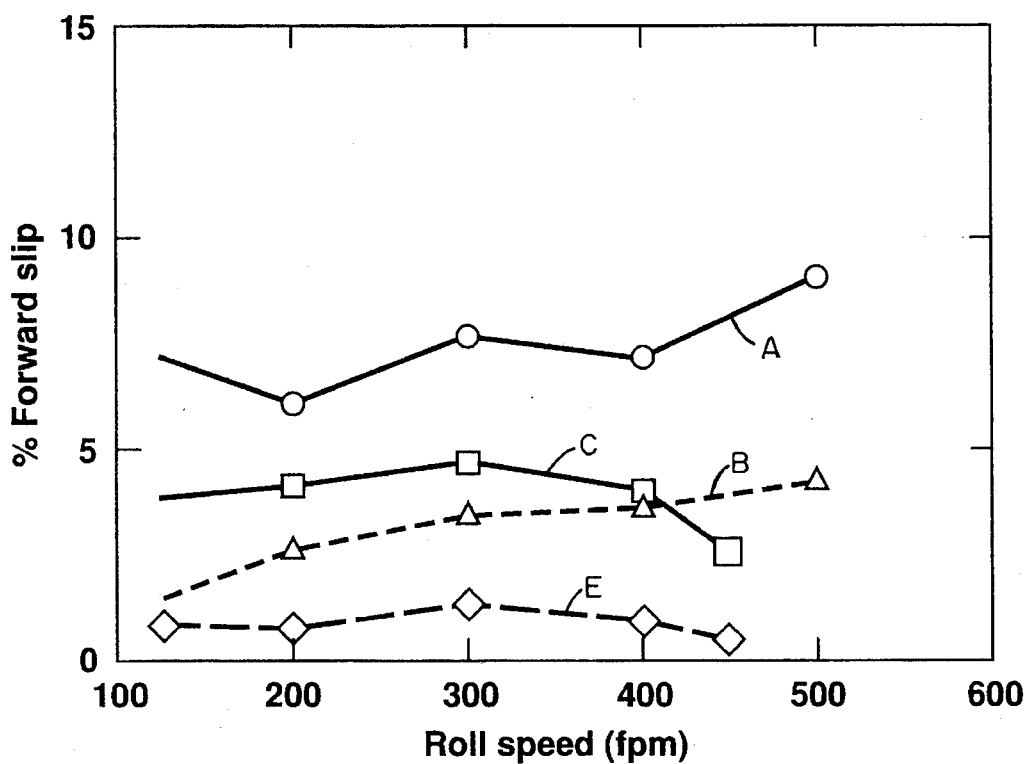
FIG. 22 is a graph showing forward slip versus roll speed for 60% reduction in thickness of an aluminum alloy strip in a four-high rolling mill using ground work roll surfaces and work roll surfaces provided with the ovoid bowls of the invention.

Forward slip values with the textured rolls of the invention are comparable to those values that commonly occur when cold rolling aluminum and its alloys with ground rolls. Evidence of this is found in FIG. 22 of the drawings, which figure compares percentage of forward slip relative to the peripheral speed of the work roll in feet per minute (fpm) during massive thickness reduction cold rolling of an aluminum alloy. Each curve represents either the ground or textured roll in contact with the top or bottom surface of the sheet. It should be noted that the forward slip values for both upper and lower ovoid bowl textured rolls lie just above their ground roll counterparts. Similar comments apply to normal thickness reduction hot rolling.

Figure 23:
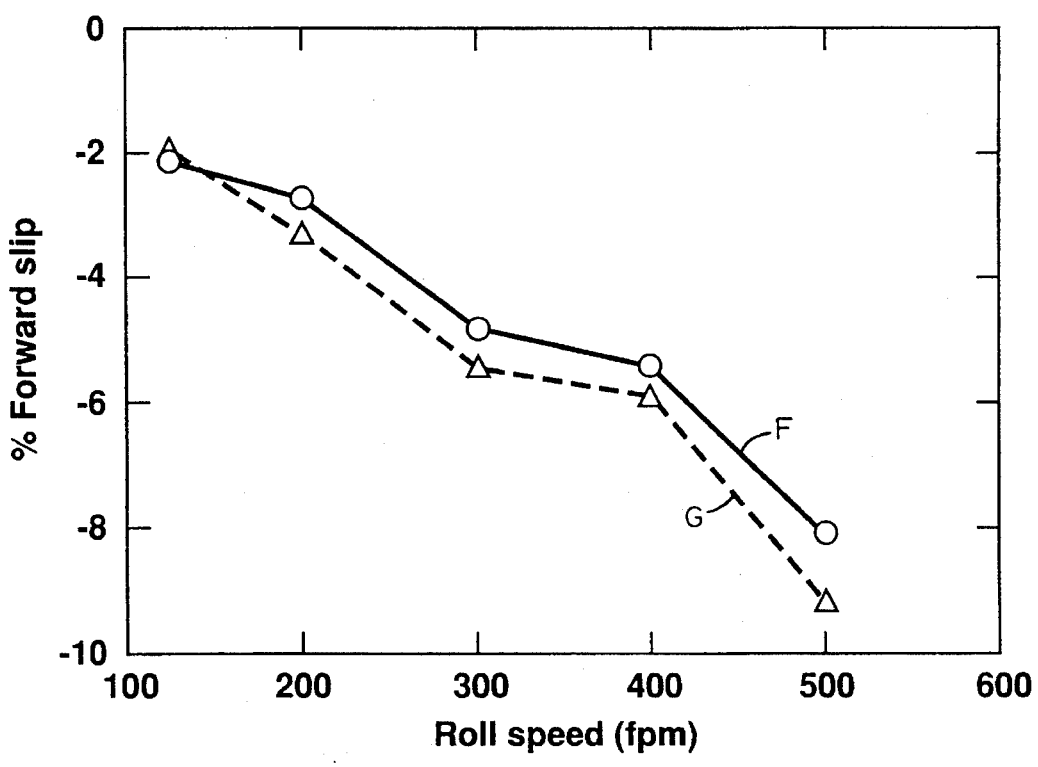
FIG. 23 is a graph depicting negative forward slip versus work roll speed at a 50% thickness reduction ratio using 5.875 inch diameter cold mill work rolls textured with the ovoid bowls.
Figure 24:
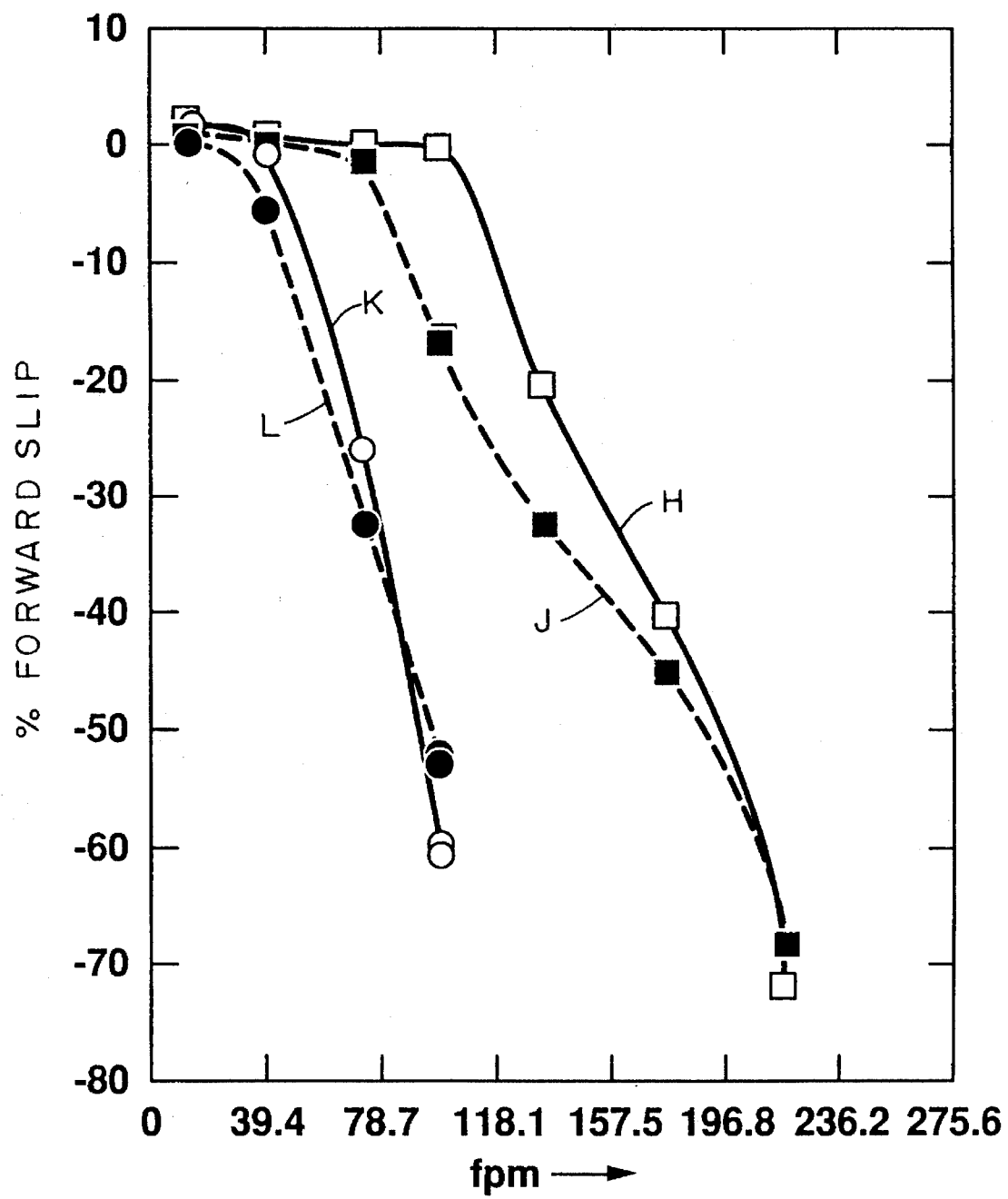
FIG. 24 is a graph showing slip phenomena with ground rolls and resulting mill instability during cold rolling of an aluminum alloy.

Occasionally, the traction needed to maintain positive forward slip becomes lost. FIG. 23 of the drawings shows a situation where skidding occurred at 50% strip thickness reduction during cold rolling with work rolls having the ovoid bowls. The forward slip became more negative as the roll speed was increased and, hence, the roll surface speed exceeded the strip surface speed in the exit side of the roll bite. However, the negative slip decreases in a somewhat linear fashion. This is quite different from the typical skidding phenomena with ground rolls during cold rolling of aluminum and its alloys, as seen in FIG. 24. As the roll speed increases, the forward slip reaches a critical value at which it then suddenly drops. The sudden change in slope that occurs in the various curves of FIG. 24 indicates a condition of gross skidding and subsequent mill instability.

Figure 25:
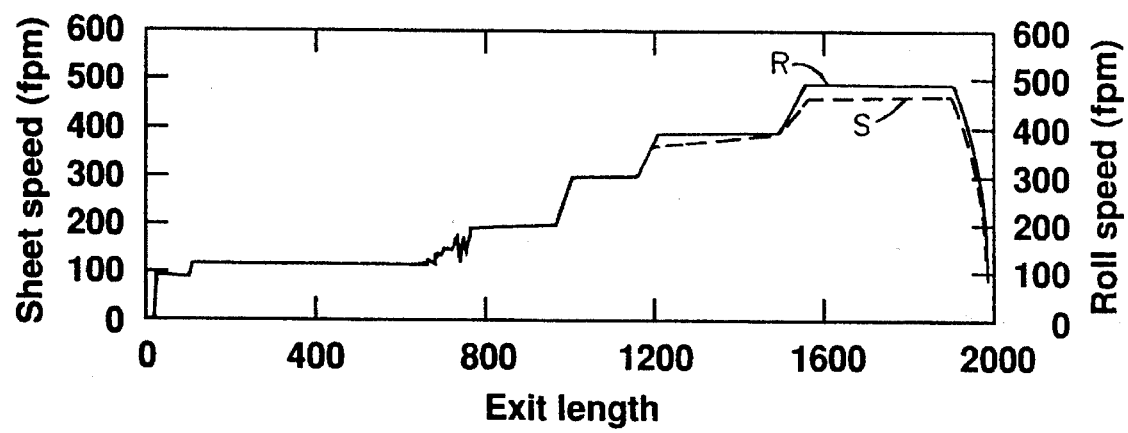
FIG. 25 is a graph depicting negative forward slip conditions, as measured during a 50% reduction in a four-high cold rolling stand with work rolls provided with the ovoid bowl texture of the invention.

FIG. 25 shows a condition of negative forward slip, as measured during a 50% reduction pass during cold rolling of an aluminum alloy using a four-high rolling mill. In this figure, the increasing negative force is evident by the growing separation between the curves corresponding to exit strip speed S in feet per minute and the top and bottom roll surface speeds R. As the exit length of strip increases, the exit speed of the strip falls beneath that of the top and bottom roll surface speeds thereby denoting a condition of negative forward slip. A qualitative comparison of the data of FIGS. 23 to 25 lends justification to the notion that textured rolls offer better rolling mill stability during situations where skidding may occur.

Figure 26:
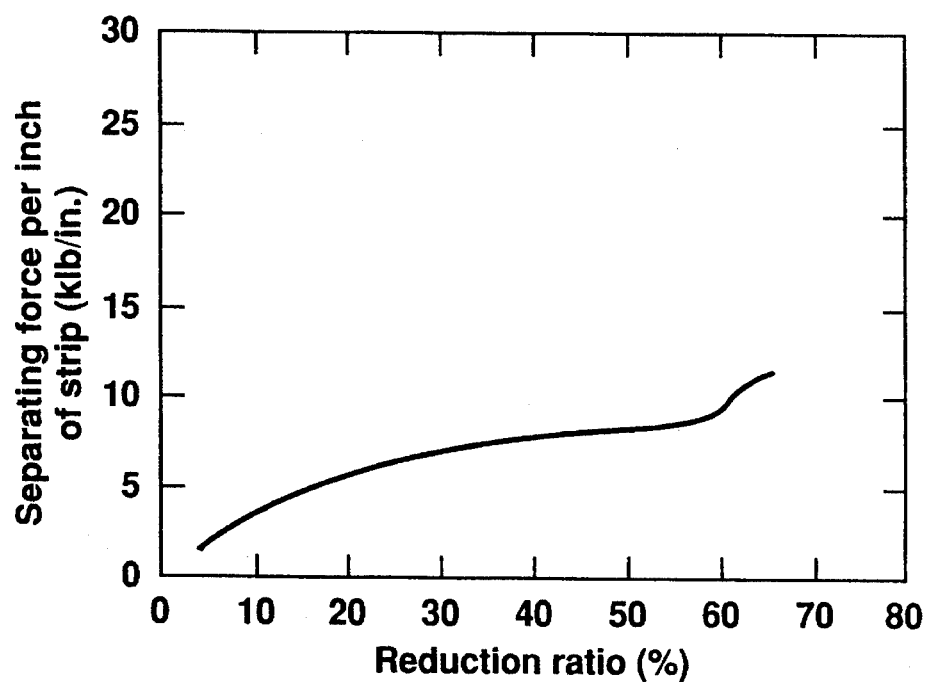
FIG. 26 is a graph showing a 68% reduction in the thickness of an aluminum strip using the ovoid bowls of the invention, without generation of the familiar herringbone pattern.

FIG. 26 shows the roll separating force as a function of strip reduction ratio during cold rolling of an aluminum strip with the ovoid bowl texture of the invention. The reduction ratio was gradually increased during the rolling process to 65%, at which point the rolling was terminated. No abnormalities in roll bite temperature were noticed and the herringbone defect was absent on that portion of the strip rolled at a 65% reduction. The slope of the curve in FIG. 26 varies only very gradually with reduction which indicates that the ovoid bowl texture contributes to enhanced stability of the rolling process while allowing massive thickness reduction rolling that is not otherwise possible with ground finishes or any of the other roll textures of the prior art that involve raised asperities such as rims or humps.

With the textures of the invention, i.e., with texture dimensions and placement, which depend upon the amount of reduction to be taken, the alloy material of the workpiece to be reduced in thickness and the speed of the process, one is able to substantially minimize the amount of solid waste generated in aluminum rolling processes that is otherwise produced during hot and cold rolling of aluminum and its alloys with ground rolls or any of the other type of roll textures mentioned herein, and hence, minimize the often negative environmental impact that results from the disposal of such solid waste and any other rolling by-products. In all experiments conducted to date with the ovoid textured rolls, the lubricant used in the rolling process maintains its clarity after rolling aluminum alloy material up to 70% reductions during cold rolling. Lubricants taken directly from a spray nozzle in a mill stand, lubricants taken from the mill stand after 30% reduction, and lubricants taken from the mill after 70% reduction, were analyzed for clarity, the clarity being indications of the smudge material in the lubricant samples. The samples were clear.

Figure 20:
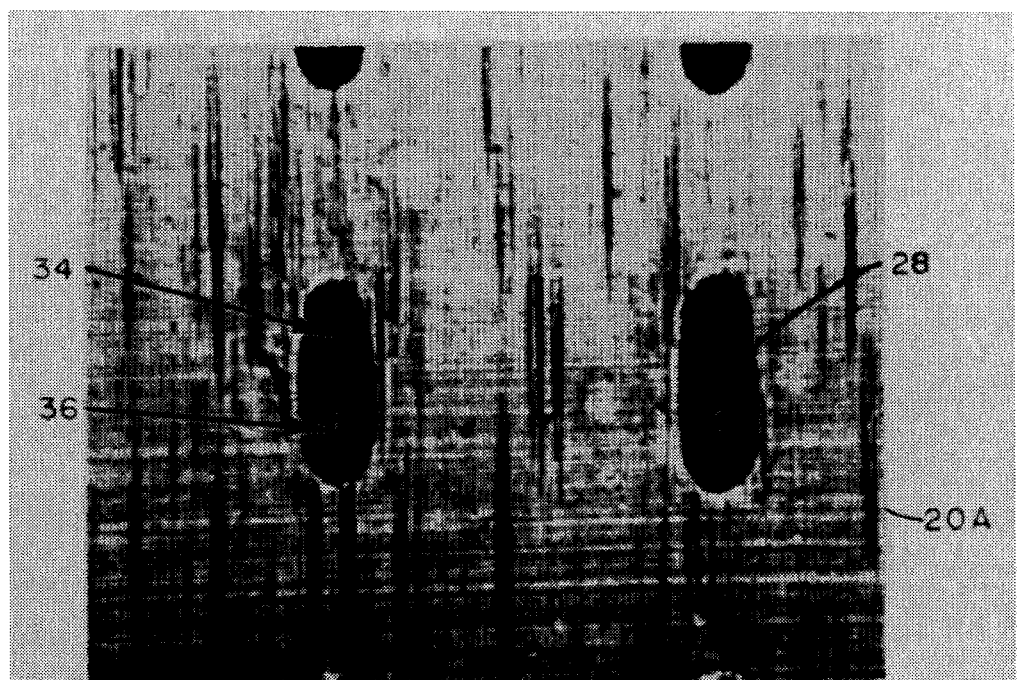
FIG. 20 is a photomicrograph of a roll surface magnified 100 times showing the slopes of ovoid bowls provided in a work roll surface.

Thus, the earlier objective of obtaining significant enhancements in strip surface cleanliness with simultaneous minimization of solid waste is the result of engineered textured roll surfaces using the ovoid bowls of the invention. FIG. 20 is evidence of this, as the photomicrograph shows the ovoid bowls provided in a roll surface unaltered after substantial rolling, though the background surface has been smoothed somewhat, leading to a very shiny surface.

While the invention has been described in terms of preferred embodiments, the claims appended hereto are intended to encompass all embodiments which fall within the spirit of the invention.

What is claimed is:

1. A bright and clean sheet metal product having minute, spaced, asymmetrical mounds that inhibit the flow of lubricant in the bite of a roll stand and when the product undergoes a secondary forming process, said product being made by the method of reducing the thickness of a metal strip in a roll stand having at least one work roll surface provided with ovoid bowls having shallow and deep ends, with the shallow ends of the bowls entering the roll stand first in the step of reducing the thickness of the metal sheet.

2. The metal product of claim 1 in which the ovoid bowls are provided in the work roll surface by a laser beam directed against the work roll surface at oblique incidence to the roll surface normal during relative movement of the beam and surface.

3. The metal product of claim 3 in which the laser beam leaves a residual pile-up of metal along the edges of the ovoid bowls, the method including the step of removing said pile-up of metal.

4. The metal product of claim 1 in which grind lines are removed from the work roll surface before the ovoid bowls are provided in said surface.

5. A method of making a strip product having a surface that is both bright and clean after being rolled by work rolls of a roll stand, comprising:

polishing the surface of at least one of the work rolls to substantially remove grind lines from the roll surface, providing the roll surface with a texture comprised of minute, ovoid depressions having relatively shallow slopes extending in the direction of rolling followed by steeper slopes at the opposite ends of the depressions, creating such depressions by directing a laser beam against the roll surface at oblique incidence to the roll surface normal during relative movement of the beam and surface, polishing the roll surface again to remove roll material that is raised above the nominal roll surface that results from melting of the roll surface and the deposition of roll material vaporized by the laser beam, and reducing the thickness of a metal material with such textured roll in the roll stand without substantial micromachining of the surface of the metal material such that the generation of wear debris and smudge is minimized in reducing the thickness of the metal material.

6. The method of claim 5 in which the metal material is a hard aluminum alloy massively reduced in thickness in the rolling stand.

7. The method of claim 5 including using the shallow slopes of the depressions in the roll surfaces during thickness reduction in a manner that leaves asymmetric mounds on a surface of the metal material, and the depressions carry lubricant to the roll and metal surfaces that form an interface between the surfaces, as the metal material passes between the work rolls.

8. The method of claim 5 in which the metal material being reduced in thickness partially extrudes into the depressions, and thereby displaces lubricant entrained in the depressions to surfaces of the metal material and work roll.

9. The method of claim 5 in which the metal material partially extrudes into the depressions to provide traction between the metal material and work roll.

10. The method of claim 5 in which the rolling stand includes work and backup rolls, the material of the backup rolls being softer than that of the work rolls such that backup roll material partially extrudes into the work roll depressions.

11. A method of reducing the thickness of a metal material between work rolls in a rolling stand when the temperature of the metal material ranges from about 850° to 980° F. without substantial transfer of metal from the surfaces of the metal material to the surfaces of the work rolls and retransfer of the metal to the surfaces of the metal material, the method comprising:

providing the surface of at least one of the work rolls with a texture comprised of minute, ovoid depressions having relatively shallow slopes in the direction of rolling and steeper slopes in the opposite direction, creating such depressions by directing a laser beam against the roll surface at oblique incidence to the roll surface normal while relative movement is provided between said roll and beam, polishing the roll surface to remove roll material that is raised above the nominal roll surface that results from melting and deposition of roll material vaporized by the laser beam, and reducing the thickness of the metal material with such textured roll in the rolling stand without substantial generation of wear debris, and without substantial transfer of metal material to the textured roll surface and retransfer to the surface of the metal material.

12. A method of providing the working surface of a work roll with ovoid depressions having shallow and steep slopes, comprising:

directing a laser beam against the working surface at oblique incidence to the roll surface normal while relative motion is provided between the roll and beam, said beam, in addition, melting the working surface and depositing melted and plasma material along edges of the depressions, and polishing the working surface to substantially remove the melted and deposited plasma material from said edges in a manner that provides substantially smooth edges.

13. The method of claim 12 including polishing the working surface before the ovoid depressions are provided to substantially remove grind lines from the working surface.

14. A method of claim 12 including circumferentially spacing the ovoid depressions along the working surface a distance that lies in the range of 175 to 3000 microns in measuring from the centers of the depressions.

15. The method of claim 12 including laterally spacing the ovoid depressions from each other a distance that lies in the range of 254 to 2540 microns in measuring from the centers of the depressions.

16. The method of claim 12 including the step of providing the width of the depressions with a dimension that lies in the range of 75 to 250 microns.

17. The method of claim 12 including providing the length of the depressions with a dimension that falls in the range of 80 to 300 microns.

18. A work roll for taking massive reductions in the thickness in strips of hard aluminum alloys, the work roll having a working surface that is substantially free of grind lines and is provided with spaced apart, ovoid depressions having shallow and deep ends that substantially limit micromachining the surfaces of strips rolled by said work roll.

19. The work roll of claim 18 in which the width of the depressions lies in a range of 75 to 250 microns.

20. The work roll of claim 18 in which the length of the bowls lies in the range of 80 to 300 microns.

21. The work roll of claim 18 in which the depressions are spaced from one another in a circumferential direction of the roll a distance lying in the range of 175 to 3000 microns measuring from the centers of the depressions.

22. The work roll of claim 18 in which the depressions are laterally spaced from one another a distance lying in the range of 254 to 2540 microns measuring from the centers of the depressions.

* * * * *